US010431003B2

(12) United States Patent
Rogers et al.

(10) Patent No.: US 10,431,003 B2
(45) Date of Patent: Oct. 1, 2019

(54) THREE-DIMENSIONAL VIRTUAL ENVIRONMENT

(71) Applicant: Roam Holdings, LLC, Harker Heights, TX (US)

(72) Inventors: Joseph D. Rogers, Sparta, MO (US); Marc E. Rogers, Nixon, MO (US)

(73) Assignee: Roam Holdings, LLC, Harker Heights, TX (US)

(*) Notice: Subject to any disclaimer, the term of this patent is extended or adjusted under 35 U.S.C. 154(b) by 0 days.

(21) Appl. No.: 15/056,412

(22) Filed: Feb. 29, 2016

(65) Prior Publication Data
US 2016/0180598 A1    Jun. 23, 2016

Related U.S. Application Data

(63) Continuation of application No. 14/061,711, filed on Oct. 23, 2013, now Pat. No. 9,311,741.
(Continued)

(51) Int. Cl.
*G06T 19/00* (2011.01)
*G06T 15/08* (2011.01)
*G06Q 20/14* (2012.01)

(52) U.S. Cl.
CPC ......... *G06T 19/006* (2013.01); *G06Q 20/145* (2013.01); *G06T 15/08* (2013.01);
(Continued)

(58) Field of Classification Search
CPC ...... G07F 17/32; G06F 3/04815; G06F 3/011; G06F 17/30873; A63F 2300/8082;
(Continued)

(56) References Cited

U.S. PATENT DOCUMENTS

2001/0019337 A1*  9/2001  Kim .................... G06F 3/04815
                                                      715/757
2003/0126035 A1    7/2003  Kake et al.
(Continued)

OTHER PUBLICATIONS

Benford et al., Visualising and Populating the Web: Collaborative Virtual Environments for Browsing, Searching and Inhabiting Webspace, Proc. 8th Joint European Nerworking Conference (JENC'8), pp. 1-9, May 1997.*
(Continued)

*Primary Examiner* — Haixia Du
(74) *Attorney, Agent, or Firm* — Remenick PLLC

(57) ABSTRACT

Systems and methods of rendering a three-dimensional (3D) virtual environment rendering are disclosed. The system comprises a central processing device, a plurality of user devices in data communication with the central processing device, a plurality of application servers in data communication with the central processing device, and software executing on the central processor. The software creates and renders a 3D virtual environment, receives user data from each of the plurality of user devices, renders the user data received from each of the user devices in the 3D virtual environment, receives application data from each of the application servers, renders the application data received from each of the application servers in the 3D virtual environment, and outputs the rendered 3D virtual environment to each of the user devices. The 3D virtual environment serves as a direct user interface with the Internet by allowing users to visually navigate the world wide web.

20 Claims, 8 Drawing Sheets

Related U.S. Application Data

(60) Provisional application No. 61/717,457, filed on Oct. 23, 2012.

(52) U.S. Cl.
CPC ............... *A63F 2300/5553* (2013.01); *A63F 2300/8082* (2013.01)

(58) Field of Classification Search
CPC ........ A63F 2300/5553; A63F 2300/407; A63F 13/12; G06Q 30/0241; H04L 41/22; G06T 17/00; G06T 19/00; G06T 19/006; G06T 2219/024; G09G 2370/022
See application file for complete search history.

(56) References Cited

U.S. PATENT DOCUMENTS

| | | |
|---|---|---|
| 2006/0206547 A1 | 9/2006 | Kulkarni et al. |
| 2008/0154625 A1* | 6/2008 | Serbanescu ........ G06Q 30/0601 705/26.1 |
| 2008/0300964 A1 | 12/2008 | Rahgunandan |
| 2009/0199275 A1 | 8/2009 | Brock et al. |
| 2009/0254843 A1* | 10/2009 | Van Wie ............. H04L 12/1822 715/757 |
| 2010/0058208 A1 | 3/2010 | Finn et al. |
| 2010/0083112 A1 | 4/2010 | Dawson et al. |
| 2010/0164956 A1* | 7/2010 | Hyndman ............... G06F 3/011 345/427 |
| 2011/0209198 A1 | 8/2011 | Blattner et al. |
| 2012/0179983 A1* | 7/2012 | Lemire ............... G06F 16/9577 715/757 |
| 2012/0192088 A1 | 7/2012 | Sauriol et al. |
| 2012/0265633 A1 | 10/2012 | Wohlstadter et al. |

OTHER PUBLICATIONS

PCT Patentability and Search Report for PCT/US2013/066465, dated Apr. 29, 2015.

* cited by examiner

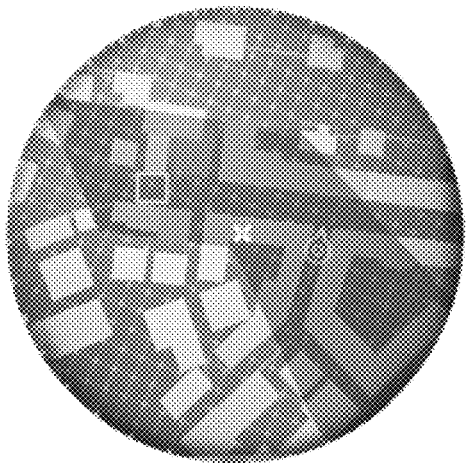
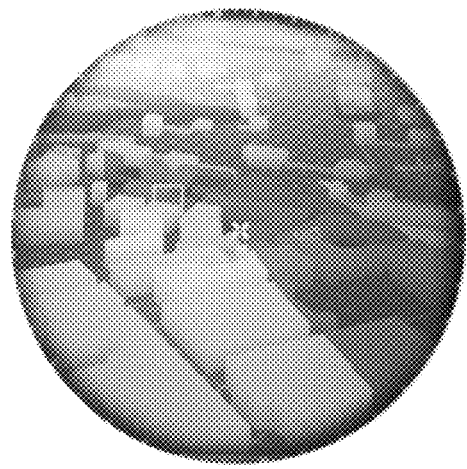
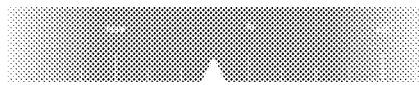
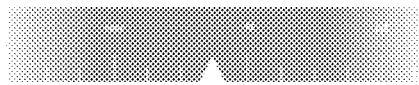
Figure 9a                                         Figure 9b
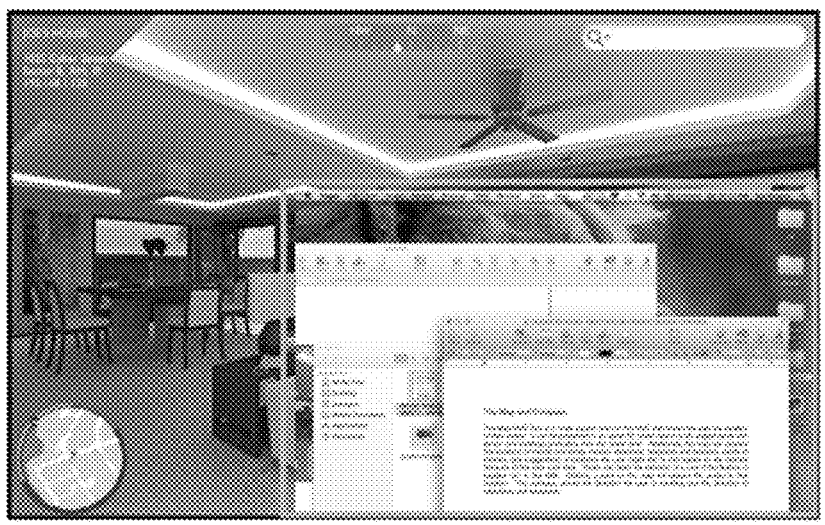
Figure 10

THREE-DIMENSIONAL VIRTUAL ENVIRONMENT

REFERENCE TO RELATED APPLICATIONS

This application is a continuation of U.S. patent application Ser. No. 14/061,711, filed Oct. 23, 2013 and entitled "Three-Dimensional Virtual Environment," which claims priority to U.S. Provisional Application No. 61/717,457 filed Oct. 23, 2012 and entitled "Three-Dimensional Virtual Environment," the entire disclosures of which are hereby incorporated herein by reference.

BACKGROUND

1. Field of the Invention

The invention is directed to systems and methods of creating, hosting, and accessing a three-dimensional (3D) virtual environment. Specifically, the invention is directed to systems and methods of creating, hosting, and accessing an on-line 3D virtual environment. More specifically, the invention is directed to systems and methods of creating, forming, expanding, and displaying a 3D virtual environment, and to portraying, identifying, and accessing websites on the internet. The invention is additionally directed to systems and methods for enabling the public to create, host, and access on-line 3D virtual environments and 3D content, and to systems and methods enabling individuals to directly participate in societal activities within a 3D virtual environment.

2. Background of the Invention

The Internet has evolved to include, among other aspects, communication tools, images, videos, gaming, commerce, and social media. The Internet is currently evolving toward the next generation of capability which will be able to more fully exploit the advantages of 3D virtual environments and content. Furthermore, the availability of 3D content is growing exponentially. The number of smart TVs, mobile devices, and other electronics which can connect to the Internet and exploit 3D capabilities is also growing exponentially.

The current systems and methods of accessing websites on the Internet are typically based on traditional two-dimensional (2D) website displays and textual addresses (such as a URL representing an IP address). The number of people who visit a particular website are usually counted and tallied into a number which is characterized as the website's "traffic". Additionally, people may "move" between two different websites via webpage links in a nearly instantaneous time frame. This internet "traffic" is invisible to the website's viewers and other website owners. While it is possible to track and tally the traffic between a specific pair of websites, the invisible traffic data is unavailable to individuals and owners of other websites due to the direct and nearly instantaneous nature of internet connections.

When visiting current 2D websites, visitors are able to interact with the various services the website offers, such as information, shopping, socializing, email, or limited computational services. However, interaction with current 2D websites is often not intuitive and the processes offered are not similar to normal everyday experiences and actions of humans and society in general. In other words, current interfaces with a 2D websites require some specific user skills or experience to fully benefit from all that the website offers. The actions required to access and interact with the websites are not necessarily natural actions that people perform on a regular basis in real life. Many people find it difficult to understand and efficiently navigate the Internet and the World Wide Web. Users may find it difficult to utilize the various non-standard interfaces of connected computers and devices and often may find it difficult to understand what service or product options the websites are presenting to them. Additionally, users may find it difficult to understand the structure, the organization of information and services, and the location of products as they navigate from one website to another since each website has its own manner of sorting and presenting the information. An unfortunate fact is that many people have limited abilities to access or relate to Internet web sites due to a lack of knowledge of the necessary processes or some other experience limitation that reduces the effectiveness of their time spent. Thus, many people are unable to realize all of the benefits of the Internet because the actions required by existing 2D interfaces do not mimic the actions they would take in the real world to achieve the same result. Current 2D websites are inherently limiting in that a user requires a level of experience and web savvy to fully benefit.

There have been a number of strong pushes to build vast 3D virtual environments. All attempts have been based on a centralized system architecture and a static engine operated by a single host, whereby businesses, organizations, and individuals are confined to the host environment.

Access to current centralized 3D environments is limited to a direct visit by an internet user. Once connected to the website visitors are limited to the environment created and hosted by the website owner. Visitors are represented by an avatar which has a range of basic and optional abilities, and, through user input, can be moved to various locations in the environment. Virtual structures and locations represent places to visit within the environment, but what is possible at these virtual locations is limited to user capabilities provided by the website host and is normally identical to any other location within the environment. Using this model, existing 3D environment builders have not created practical traffic flows to attract businesses nor the commerce tools to enable user-friendly and effective transactions in the 3D environments. Broadly speaking, they have not yet generated 3D environments which enable users to execute the full range of internet potential.

There are some 3D websites which offer the possibility to purchase or otherwise acquire new items to expand the number of objects within the 3D environment or change the look of an avatar or object. However, no known 3D environment offers individuals and organizations the ability to directly create and apply new technologies to the environment itself or to create completely new applications and capabilities that add to, alter, and advance the 3D environment itself and its overall productivity. Such an approach is inherently self-limiting since improvements to the existing 3D environments, such as entirely new capabilities, are limited to and wholly dependent on items or capabilities directly offered by the resources and capabilities of the website host. Thus, greater creativity and innovation within the website is limited because users cannot directly create new advancements or alter the 3D environment without host involvement. Such user participation has been the primary driver behind the evolution of the internet to date and is the key to enabling a fully capable 3D internet to evolve.

The current 3D environments do not incorporate other website 3D content in a networked, cooperative manner and do not enable open expansion of 3D content beyond the website itself. The existing 3D environments additionally do not open expansion of the environment boundaries beyond the website itself, or efficient and open development of new capabilities across the board. By not being networked, other existing 3D environments are not visible to users while they are traversing the host 3D environment. The inability to identify other websites or environments from within the 3D environment means current 3D environments cannot act as an effective interface to the larger internet. By not being able to visualize the internet (able to observe visible representations of other websites simultaneously from within the 3D environment) users do not have a way to interface with the internet itself other than navigating away from the website hosting the closed 3D environment they are visiting.

Attempts so far to spark evolution of the 2D internet into a 3D internet have not kept the 2D interface advantages in mind (such as instantaneous access to information and navigation). While in a single existing 3D environment website, users are often unable to take full advantage of several other common internet enabled services (such as email, social media, and search functions), because the 2D interfaces within the 3D environments do not effectively and fully integrate these services into the 3D environment. Instead, the 2D interface, if available within the environment is generally a standalone action and causes users to trade off some 2D web advantages in order to operate in the 3D environment. In the process, they do not effectively integrate with the 3D environment and retain full 2D internet effectiveness.

Thus there is a need for a 3D world wide web comprised of a system of networked 3D virtual environments which operate together as a single larger integrated 3D virtual environment. There is also a need for a "Visual Network Environment" that can display a representation of multiple internet websites simultaneously as a single, large, and integrated 3D virtual environment. A 3D virtual environment will provide an intuitive structure and spatial organization to the many websites available now and in the future. The need is for a decentralized 3D virtual environment that is not just another website on the Internet, but rather a 3D environment serving as a user interface for the entire Internet, and which, for all practical purposes, represents both the internet websites and the internet users. Such an integrated 3D environment will enable individuals to take advantage of internet capabilities using the same intuitive actions they execute every day in the physical world.

There is also a need for a method within a system of networked 3D virtual environments comprising a 3D World Wide Web that will allow individuals and organizations to include, control, protect, and advance their 3D content and operations within the single larger integrated environment.

Likewise, there is a need for a visual interface which integrates 2D website advantages and tools with 3D environment tools and capabilities without leaving the 3D environment. Such an interface is preferably not simply another browser display that makes 2D websites available from the 3D environment but rather an interface, fully integrated into the 3D environment display, which retains 2D advantages within the 3D environment.

Additionally, there is a need for a system and method to provide an inherent capability for individuals and organizations to directly participate in the expansion and technological advancement of the 3D visual network environment content and to directly create, add to, alter, or otherwise improve user capabilities within the environment in a manner consistent with the real world environment.

SUMMARY OF THE INVENTION

The present invention overcomes the problems and disadvantages associated with current strategies and designs and provides new systems and methods of allowing people to interact with other people, companies, and other entities on-line.

One embodiment of the invention is directed to a three-dimensional (3D) virtual environment rendering system. The system comprises a central processing device, a plurality of user devices in data communication with the central processing device, a plurality of application servers in data communication with the central processing device, and software executing on the central processor. The software creates and renders a 3D virtual environment, receives user data from each of the plurality of user devices, renders the user data received from each of the user devices in the 3D virtual environment, receives application data from each of the application servers, renders the application data received from each of the application servers in the 3D virtual environment, and outputs the rendered 3D virtual environment to each of the user devices. The 3D virtual environment serves as a direct user interface with the Internet by allowing users to visually navigate the world wide web.

In a preferred embodiment, the application data rendered in the 3D virtual environment affects each user's interactions with the 3D virtual environment. Preferably at least a portion of the application data rendered in the 3D virtual environment creates one of a virtual store, a user's avatar, a user's virtual storage, virtual scenery, another structure, a product, functions or scripts that affect the 3D virtual environment, applications or collections of scripts, objects that represent applications, objects that represent functions, structures with applications and functions as a package, a representation of a real world object or combinations thereof. The application data is preferably metadata directing the central processor to an executable application for rendering in the 3D virtual environment. Preferably, the metadata includes at least one of where the source application exists, who can execute the application, and what events trigger the execution of the application.

Preferably, the data received from each user includes at least one of the users IP address, the type of device the user is accessing the 3D virtual environment from, the operating system and version of the user's device, the browser and version of the user's device, the peripheral components connected to the user's device, and real world location information of the user. In a preferred embodiment, the central processor renders a unique view of the 3D virtual environment for each user that is based on the location of the user within the 3D virtual environment and changes as the user navigates though the 3D virtual environment.

The 3D virtual environment is preferably divided into a plurality of zones, wherein each zone is associated with at least one application that dictates the ability of users to interact the 3D virtual environment within the zone. Preferably, each zone covers at least a portion of the 3D virtual environment or is associated with an object within the 3D virtual environment. Preferably, at least a portion of the users control portions of the 3D virtual environment and the users are presented with the option of creating and editing zones in the portions of the 3D virtual environment within each user's control. In a preferred embodiment, users are presented with the option of associating applications to zones in the portions of the 3D virtual environment within each user's control. Preferably, at least one application associated with a zone presents a user with the option of toggling between a 2D website and the 3D virtual environment. As a user navigates through the 2D website, preferably an avatar of the user moves, correspondingly, through the 3D virtual environment. Preferably, at least one zone is associated with at least one real world location and a user visiting the zone in the 3D virtual environment and a person, with a augmented reality device, visiting the at least one real world location is presented with at least some of the same information.

The software executing on the central processor preferably further renders augmented virtual reality information within the 3D virtual environment, wherein the augmented reality information provides the user with information about the 3D virtual environment and objects within the 3D virtual environment. Preferably, the users are presented with the option of creating and editing augmented virtual reality information for rendering in the 3D virtual environment.

In a preferred embodiment, the user views the 3D virtual environment through a heads up display (HUD), wherein the HUD is overlaid on the virtual environment and displays applications that at least one of allow the user to interact with the 3D virtual environment, provides the user with information pertaining to the 3D virtual environment or the real world, and allows the user to access data on the user's device or cloud storage associated with a user's account. Preferably, the users are presented with the option of editing, adjusting, and customizing their HUD.

The system preferably further comprises a database of application data accessible to users to associate applications with at least a portion of the 3D virtual environment. Preferably, at least a portion of the users control portions of the 3D virtual environment and a fee is charged for each portion of the 3D virtual environment controlled by the users. In a preferred embodiment, the fee is calculated based on the number of users that navigate past the 3D website over a given amount of time, the amount of time each user spends within the 3D website, and a percentage of transactions the occur within the 3D website over the given amount of time.

Preferably, at least a portion of the users control portions of the 3D virtual environment and each controlled portion of the 3D virtual environment is associated with a set of applications that provide the controlling user the ability to edit, enhance, and control the portion of the 3D virtual environment. Preferably, users are presented with the option of exchanging control of the portions of the 3D virtual environment with the system or other users, and the associated set of applications is exchanged with the control of the portion of the 3D virtual environment. The set of applications preferably includes virtual storage associated with the portion of the 3D virtual environment, wherein the virtual storage is adapted to store additional applications to be associated with the portion of the 3D virtual environment and user files.

In a preferred embodiment, each user is assigned a designated amount of virtual storage space to store files and applications in their assigned virtual storage space for use within and without the 3D virtual environment. Preferably, each user's virtual storage space is represented as a 3D property or 3D structure within the 3D virtual environment. The virtual storage space is preferably dividable into sub-directories and at least one sub-directory is represented as a virtual room within the 3D structure. Preferably, applications and data added to the virtual storage space is simultaneously added to the 3D structure and applications and data added to the 3D structure is simultaneously added to the virtual storage space. In a preferred embodiment, each user's virtual storage space and 3D structure is accessible remotely through the 3D virtual environment or heads up display (HUD).

Preferably, the software further enables transactions between users by accepting payments on behalf of sellers and providing purchase information on behalf of buyers. Sellers are preferably presented with the option of selling real world products, virtual products, and applications. Preferably, the software obtains UPC information from sellers and automatically populates a seller's store with virtual representations of the products associated with the UPC information.

Another embodiment of the invention is directed to a method of rendering a three-dimensional (3D) virtual environment. The method comprises the steps of, on a central processor, creating and rendering a 3D virtual environment, receiving user data from each of the plurality of user devices, rendering the user data received from each of the user devices in the 3D virtual environment, receiving application data from each of the application servers, rendering the application data received from each of the application servers in the 3D virtual environment, and outputting the rendered 3D virtual environment to each of the user devices. The 3D virtual environment serves as a direct user interface with the Internet by allowing users to visually navigate the world wide web.

In a preferred embodiment, the application data rendered in the 3D virtual environment affects each user's interactions with the 3D virtual environment. Preferably at least a portion of the application data rendered in the 3D virtual environment creates one of a virtual store, a user's avatar, a user's virtual storage, virtual scenery, another structure, a product, functions or scripts that affect the 3D virtual environment, applications or collections of scripts, objects that represent applications, objects that represent functions, structures with applications and functions as a package, a representation of a real world object or combinations thereof. The application data is preferably metadata directing the central processor to an executable application for rendering in the 3D virtual environment. Preferably, the metadata includes at least one of where the source application exists, who can execute the application, and what events trigger the execution of the application.

Preferably, the data received from each user includes at least one of the users IP address, the type of device the user is accessing the 3D virtual environment from, the operating system and version of the user's device, the browser and version of the user's device, the peripheral components connected to the user's device, and real world location information of the user. In a preferred embodiment, the central processor renders a unique view of the 3D virtual environment for each user that is based on the location of the user within the 3D virtual environment and changes as the user navigates though the 3D virtual environment.

The 3D virtual environment is preferably divided into a plurality of zones, wherein each zone is associated with at least one application that dictates the ability of users to interact the 3D virtual environment within the zone. Preferably, each zone covers at least a portion of the 3D virtual environment or is associated with an object within the 3D virtual environment. Preferably, at least a portion of the users control portions of the 3D virtual environment and the users are presented with the option of creating and editing zones in the portions of the 3D virtual environment within each user's control. In a preferred embodiment, users are presented with the option of associating applications to zones in the portions of the 3D virtual environment within each user's control. Preferably, at least one application associated with a zone presents a user with the option of toggling between a 2D website and the 3D virtual environment. As a user navigates through the 2D website, preferably an avatar of the user moves, correspondingly, through the 3D virtual environment. Preferably, at least one zone is associated with at least one real world location and a user visiting the zone in the 3D virtual environment and a person, with a augmented reality device, visiting the at least one real world location is presented with at least some of the same information.

The software executing on the central processor preferably further renders augmented virtual reality information within the 3D virtual environment, wherein the augmented reality information provides the user with information about the 3D virtual environment and objects within the 3D virtual environment. Preferably, the users are presented with the option of creating and editing augmented virtual reality information for rendering in the 3D virtual environment.

In a preferred embodiment, the user views the 3D virtual environment through a heads up display (HUD), wherein the HUD is overlaid on the virtual environment and displays applications that at least one of allow the user to interact with the 3D virtual environment, provides the user with information pertaining to the 3D virtual environment or the real world, and allows the user to access data on the user's device or cloud storage associated with a user's account. Preferably, the users are presented with the option of editing, adjusting, and customizing their HUD.

The method preferably further comprises providing a database of application data accessible to users to associate applications with at least a portion of the 3D virtual environment. Preferably, at least a portion of the users control portions of the 3D virtual environment and a fee is charged for each portion of the 3D virtual environment controlled by the users. In a preferred embodiment, the fee is calculated based on the number of users that navigate past the 3D website over a given amount of time, the amount of time each user spends within the 3D website, and a percentage of transactions the occur within the 3D website over the given amount of time.

Preferably, at least a portion of the users control portions of the 3D virtual environment and each controlled portion of the 3D virtual environment is associated with a set of applications that provide the controlling user the ability to edit, enhance, and control the portion of the 3D virtual environment. Preferably, users are presented with the option of exchanging control of the portions of the 3D virtual environment with the system or other users, and the associated set of applications is exchanged with the control of the portion of the 3D virtual environment. The set of applications preferably includes virtual storage associated with the portion of the 3D virtual environment, wherein the virtual storage is adapted to store additional applications to be associated with the portion of the 3D virtual environment and user files.

In a preferred embodiment, each user is assigned a designated amount of virtual storage space to store files and applications in their assigned virtual storage space for use within and without the 3D virtual environment. Preferably, each user's virtual storage space is represented as a 3D property or 3D structure within the 3D virtual environment. The virtual storage space is preferably dividable into subdirectories and at least one sub-directory is represented as a virtual room within the 3D structure. Preferably, applications and data added to the virtual storage space is simultaneously added to the 3D structure and applications and data added to the 3D structure is simultaneously added to the virtual storage space. In a preferred embodiment, each user's virtual storage space and 3D structure is accessible remotely through the 3D virtual environment or heads up display (HUD).

Preferably, the method further comprises enabling transactions between users by accepting payments on behalf of sellers and providing purchase information on behalf of buyers. Sellers are preferably presented with the option of selling real world products, virtual products, and applications. Preferably, the method further comprises obtaining UPC information from sellers and automatically populates a seller's store with virtual representations of the products associated with the UPC information.

Another embodiment of the invention is directed to computer readable media for rendering a three-dimensional (3D) virtual environment. The computer readable media directs a central processor to create and render a 3D virtual environment, receive user data from each of the plurality of user devices, render the user data received from each of the user devices in the 3D virtual environment, receive application data from each of the application servers, render the application data received from each of the application servers in the 3D virtual environment, and output the rendered 3D virtual environment to each of the user devices. The 3D virtual environment serves as a direct user interface with the Internet by allowing users to visually navigate the world wide web.

In a preferred embodiment, the application data rendered in the 3D virtual environment affects each user's interactions with the 3D virtual environment. Preferably at least a portion of the application data rendered in the 3D virtual environment creates one of a virtual store, a user's avatar, a user's virtual storage, virtual scenery, another structure, a product, functions or scripts that affect the 3D virtual environment, applications or collections of scripts, objects that represent applications, objects that represent functions, structures with applications and functions as a package, a representation of a real world object or combinations thereof. The application data is preferably metadata directing the central processor to an executable application for rendering in the 3D virtual environment. Preferably, the metadata includes at least one of where the source application exists, who can execute the application, and what events trigger the execution of the application.

Preferably, the data received from each user includes at least one of the users IP address, the type of device the user is accessing the 3D virtual environment from, the operating system and version of the user's device, the browser and version of the user's device, the peripheral components connected to the user's device, and real world location information of the user. In a preferred embodiment, the central processor renders a unique view of the 3D virtual environment for each user that is based on the location of the user within the 3D virtual environment and changes as the user navigates though the 3D virtual environment.

The 3D virtual environment is preferably divided into a plurality of zones, wherein each zone is associated with at least one application that dictates the ability of users to interact the 3D virtual environment within the zone. Preferably, each zone covers at least a portion of the 3D virtual environment or is associated with an object within the 3D virtual environment. Preferably, at least a portion of the users control portions of the 3D virtual environment and the users are presented with the option of creating and editing zones in the portions of the 3D virtual environment within each user's control. In a preferred embodiment, users are presented with the option of associating applications to zones in the portions of the 3D virtual environment within each user's control. Preferably, at least one application associated with a zone presents a user with the option of toggling between a 2D website and the 3D virtual environment. As a user navigates through the 2D website, preferably an avatar of the user moves, correspondingly, through the 3D virtual environment. Preferably, at least one zone is associated with at least one real world location and a user visiting the zone in the 3D virtual environment and a person, with a augmented reality device, visiting the at least one real world location is presented with at least some of the same information.

The software executing on the central processor preferably further renders augmented virtual reality information within the 3D virtual environment, wherein the augmented reality information provides the user with information about the 3D virtual environment and objects within the 3D virtual environment. Preferably, the users are presented with the option of creating and editing augmented virtual reality information for rendering in the 3D virtual environment.

In a preferred embodiment, the user views the 3D virtual environment through a heads up display (HUD), wherein the HUD is overlaid on the virtual environment and displays applications that at least one of allow the user to interact with the 3D virtual environment, provides the user with information pertaining to the 3D virtual environment or the real world, and allows the user to access data on the user's device or cloud storage associated with a user's account. Preferably, the users are presented with the option of editing, adjusting, and customizing their HUD.

The computer readable media further directs the central processor to provide a database of application data accessible to users to associate applications with at least a portion of the 3D virtual environment. Preferably, at least a portion of the users control portions of the 3D virtual environment and a fee is charged for each portion of the 3D virtual environment controlled by the users. In a preferred embodiment, the fee is calculated based on the number of users that navigate past the 3D website over a given amount of time, the amount of time each user spends within the 3D website, and a percentage of transactions the occur within the 3D website over the given amount of time.

Preferably, at least a portion of the users control portions of the 3D virtual environment and each controlled portion of the 3D virtual environment is associated with a set of applications that provide the controlling user the ability to edit, enhance, and control the portion of the 3D virtual environment. Preferably, users are presented with the option of exchanging control of the portions of the 3D virtual environment with the system or other users, and the associated set of applications is exchanged with the control of the portion of the 3D virtual environment. The set of applications preferably includes virtual storage associated with the portion of the 3D virtual environment, wherein the virtual storage is adapted to store additional applications to be associated with the portion of the 3D virtual environment and user files.

In a preferred embodiment, each user is assigned a designated amount of virtual storage space to store files and applications in their assigned virtual storage space for use within and without the 3D virtual environment. Preferably, each user's virtual storage space is represented as a 3D property or 3D structure within the 3D virtual environment. The virtual storage space is preferably dividable into sub-directories and at least one sub-directory is represented as a virtual room within the 3D structure. Preferably, applications and data added to the virtual storage space is simultaneously added to the 3D structure and applications and data added to the 3D structure is simultaneously added to the virtual storage space. In a preferred embodiment, each user's virtual storage space and 3D structure is accessible remotely through the 3D virtual environment or heads up display (HUD).

Preferably, the computer readable media further directs the central processor to enable transactions between users by accepting payments on behalf of sellers and providing purchase information on behalf of buyers. Sellers are preferably presented with the option of selling real world products, virtual products, and applications. Preferably, the computer readable media further directs the central processor to obtain UPC information from sellers and automatically populates a seller's store with virtual representations of the products associated with the UPC information.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which:

FIGS. 9a-b depict embodiments of map and compass tools.

FIG. 10 depicts an embodiment of a desktop window within the HUD.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
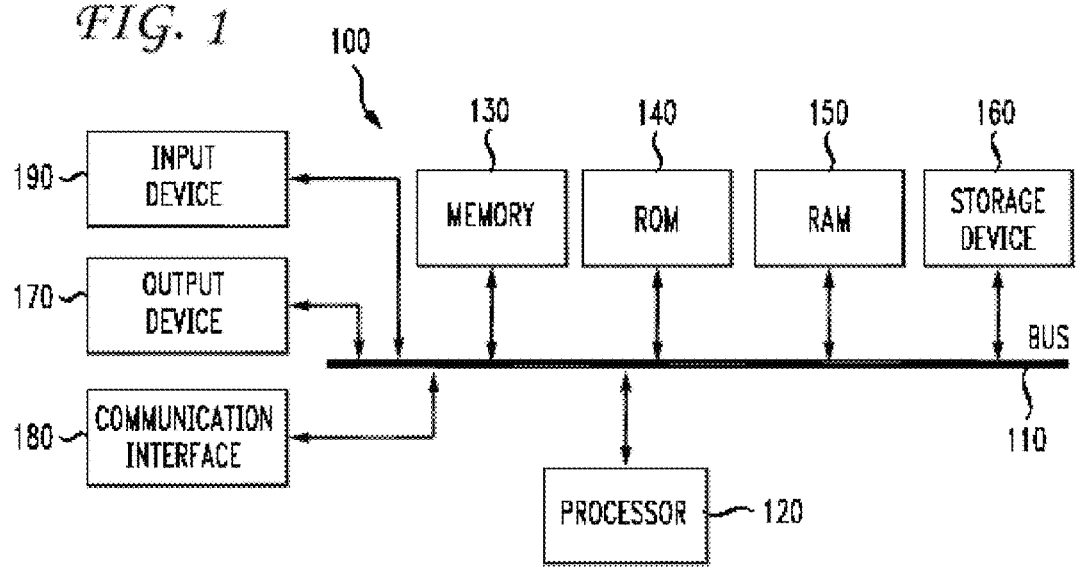
FIG. 1 is a schematic of an embodiment of the system of the invention.

With reference to FIG. 1, an exemplary system includes at least one general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, a computer server, a handheld scanning device, or a wireless devices, including wireless Personal Digital Assistants ("PDAs"), tablet devices, wireless web-enabled or "smart" phones (e.g., Research in Motion's Blackberry™, an Android™ device, Apple's iPhone™), other wireless phones, a game console (e.g, a Playstation™, an Xbox™, or a Wii™), a Smart TV, a wearable internet connected device, etc. Preferably, the system is technology agnostic.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech, game console controller, TV remote and so forth. The output device 170 can be one or more of a number of output mechanisms known to those of skill in the art, for example, printers, monitors, projectors, speakers, and plotters. In some embodiments, the output can be via a network interface, for example uploading to a website, emailing, attached to or placed within other electronic files, and sending an SMS or MMS message. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software.

For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate the preferred embodiments of the invention may be practiced in network computing environments with many types of computer system configurations, including personal computers, handheld devices, multi-processor systems, microprocessor-based or programmable consumer electronics, network PCs, minicomputers, mainframe computers, and the like. Networks may include the Internet, one or more Local Area Networks ("LANs"), one or more Metropolitan Area Networks ("MANs"), one or more Wide Area Networks ("WANs"), one or more Intranets, etc. Embodiments may also be practiced in distributed computing environments where tasks are performed by local and remote processing devices that are linked (either by hardwired links, wireless links, or by a combination thereof) through a communications network, e.g. in the "cloud." In a distributed computing environment, program modules may be located in both local and remote memory storage devices.

Augmented 3D (A3D)

Augmented 3D (A3D) is preferably comprised of three components: (1) the visual network environment, (2) a heads up display (HUD) type user interface, and (3) augmented virtual reality (AVR) information overlaid on the virtual environment. The components, when combined, preferably result in a single integrated user interface for web interfacing, interaction between users, and personal computing activities delivered as an immersive and unified user experience.

Figure 2:
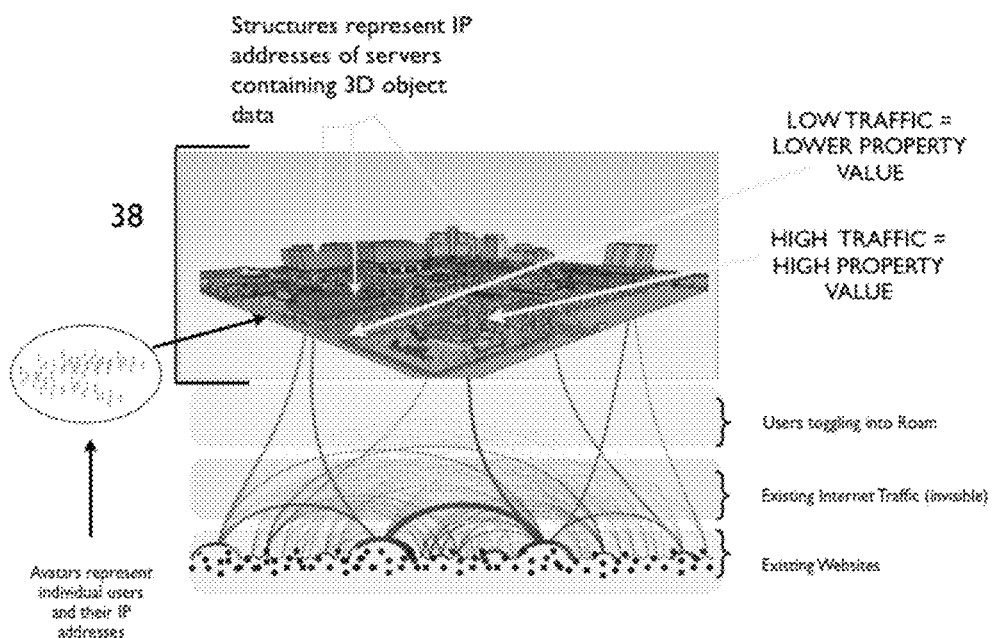
FIG. 2 is a representation of a visualization of Internet traffic.

(1) The visual network environment (VNE) is preferably comprised of a network of distributed servers which may be geographically separated and/or on a local area network, some of which may be independently owned and operated (for example as shown in FIG. 2). Preferably, each server contains 3D object data, environment data, and other web data or information, which may when rendered as a whole comprise a larger virtual environment. Preferably, the virtual environment is centrally rendered (e.g. in the cloud) with a common engine and is streamed to users as a single interactive virtual environment (or a holistic 3D web interface). Preferably the content of the VNE is distributed across the web and can be accessed and rendered as a whole to visualize the network content. The VNE preferably visualizes the web and the web traffic as a single virtual environment that users navigate through by controlling an avatar. For example, the virtual environment may be comprised of virtual structures and each virtual structure in the environment may represent the IP address of a server in the network or web at large. Throughout the this document the term "virtual environment" (VE) or "environment" refer to the Visual Network Environment (described herein), however no use of the term "VE" is intended to apply only to the term "VNE" and any components or inventions contained herein may apply to virtual environments in general.

(2) The HUD is preferably the user's 2D interface for applications and information. The HUD integrates the user's personal computing activities and allows them to interface with web applications pertaining to the virtual environment, their personal storage, and the world wide web, at large. Applications (apps) on a user's HUD may have been purchased from an app store and may be designed specifically for HUD use to provide information about the virtual environment and provide accessibility options for other applications and information. For example, a Twitter app may provide interactive Twitter feeds on the HUD, or a Pandora app may provide station control buttons on the HUD to control a user's music. The HUD is the user's cloud based desktop for their cloud computer, or user instance with associated storage space.

(3) Augmented Virtual Reality (AVR) preferably is information created by property owners throughout the environment can be seen by users as translucent, floating, interactive information in the virtual environment. Such information can be overlaid on the environment and pertain to avatars, objects, or places in the environment using the "AVR/AR Editor" described herein. AVR is similar to augmented reality (AR) in the real world. An example of real world AR is interactive, translucent, floating information viewable to a person in the real world using an AR device, such as AR glasses or camera phones with appropriate apps.

The VNE, HUD, and AVR, when combined and delivered as a single user experience, can be called "A3D". It creates a unique interface that integrates 2D and 3D web interfacing and exploration, personal computing activities and user collaboration and interaction. A3D enables users to, for example, simultaneously move through the 3D virtual environment, visit businesses and other web presences, interact with other users in the virtual environment, interface with 2D applications and information pertaining to the virtual environment, interface with the web at large, and perform personal computing activities.

System Infrastructure

Throughout this document, the use of the terms "stream(s)," "streaming" and "transmit(s)" regarding data and other terms regarding data communications between components may be representative of the "routing" of data in the system.

In a preferred embodiment, a switch board server detects each user, collects and/or compiles the user's data in a user data package (UDP) and transmits the UDP to an assignment server. The switch board server preferably also receives the location of an assigned user instance from the assignment server and redirects the user to that location. A UDP is preferably an electronic file or package containing data about a user. For example, the UDP can contain the IP address of the user's device, the type of device, the operating system and version, the browser and version, any connected peripheral components, a GPS location of the device, the elevation, horizontal direction and vertical angle of the device, and/or other collected data. The assignment server, in communication with the render bank (a collection of user instance processing units), preferably processes the information contained in the UDP, identifies an available user instance in the render bank (a collection of user instance processing units), and transmits the location of the available user instance to the switchboard server which then redirects the user to the assigned user instance in the render bank.

Preferably, a user instance is the single or set of processing units in the render bank that users communicate with via the internet. The user instance preferably streams data to a directory grid server, receives data from "multiple servers" in the local area network, world wide web, or other network, and processes the data (or "renders" the data) as a graphical virtual environment. "Multiple servers" may include property servers described herein or servers containing source applications, source object data and other source data on other servers. The virtual environment is preferably streamed to the user's device in the form of HD (high definition) streaming video. Data streamed from the user instance to the directory grid server may include, for example the user's position on the grid (using a coordinate system), location on the local area network of the user's user instance, and other user inputs. User inputs may include, for example, video from a web camera, keystrokes on a keyboard connected to the user's device, mouse inputs, voice inputs from the device's microphone, or other user initiated inputs. The grid is the coordinate system for the environment, and the objects, data and locations in it; and preferably defines the dimensions, on an x, y, z axis, of the virtual environment and subsections therein.

The directory grid server preferably receives data from the user instance, contains or accesses the grid, compiles and tracks data pertaining to the dimensions of properties and zones throughout the environment from other servers, as well as, data pertaining to what servers contain or are "responsible" for the data associated with the zones and properties. The directory grid server preferably also streams user data to the servers responsible for the zones and properties that the user is in. This data may include, for example, user instance location on the network, position of the user on the grid, user inputs, and other information.

For example, when a user visits a website on the world wide web that has a corresponding 3D property within the virtual environment and the user chooses to view the 3D version, the user is redirected to the virtual environment website. When the user connects with the virtual environment website, the switchboard server detects the new IP address of the user's device and the IP address of the website from which the user was redirected, as well as, other UDP data. The switchboard server transmits the UDP to the assignment server (which may be a separate server from the switchboard server) on a local area network. The assignment server processes the UDP and assigns an appropriate available user instance in the render bank for the user to be redirected to. The assignment server then transmits the location on the network of the assigned user instance to the switchboard server, which, in turn, redirects the user to the assigned user instance.

The user instance may contain a suite or set of applications or access cloud based application(s) that receive data from "other servers" on the world wide web or on a local area network that is then rendered as a virtual environment on the user instance and streamed to the user's device in the form of HD streaming video. "Other servers" may include property servers described herein or servers containing source applications, source object data and other source data on other servers. The location on the grid where the user is introduced into the virtual environment is preferably determined by the assignment server and is based on information obtained in the UDP. The assignment server may contain or access a database of IP addresses of websites corresponding with properties in the virtual environment and may match the IP address of the website from which the user was redirected to the virtual environment with a location on the grid.

The user inputs that enable the user to navigate the environment through the use of an avatar are preferably processed by the user instance to determine in real time where the avatar "is" in the environment and streams the user's position to the directory grid. Other data that is streamed to the directory grid server may include the location of the user instance on the network and user inputs. The directory grid server preferably receives the data from the user instance and may contain or access the grid and a database of the locations and dimensions of properties in the virtual environment and the locations of the servers containing data pertaining to the properties which may be called "Property Servers". The directory grid server then preferably streams the user position on the grid, the location of the user instance on the network and user inputs to the property servers.

The property servers may contain or have access to a suite or set of applications that enable the administrator of the property server (owner of the property) to create and store zones and to associate applications with the zones, as well as perform other development activities on the property that effect the user's experience. In all cases, a user is preferably on at least two properties: the virtual environment property and the individual property owner's property. This allows for developments throughout the environment (on all properties) by the virtual environment administrator. In certain embodiments, when a property is "sold" the virtual environment administrator has no ability to develop functionality accessible on that property that was sold. The property server may transmit data to the user instance based on the user's position on the grid and user inputs. The property server may transmit data pertaining to the user to other servers, which may include servers containing source applications, source object data and other source data pertaining to the property. Those other servers may then transmit data to the user instance. The user instance processes data received from the servers, renders the environment, and streams video to the user device.

For example, the complete data or "source" of applications, objects, information and other data that may be on a property, in a property server, or be associated with a property may in some or all cases be contained on servers that are separate from the property server and the property server may contain only metadata for these. The user position, location of user instance, and user inputs may be pushed or streamed to these sources from the property server. The sources may then transmit or stream data to the user instance to be rendered and streamed to the user device.

Figure 3:
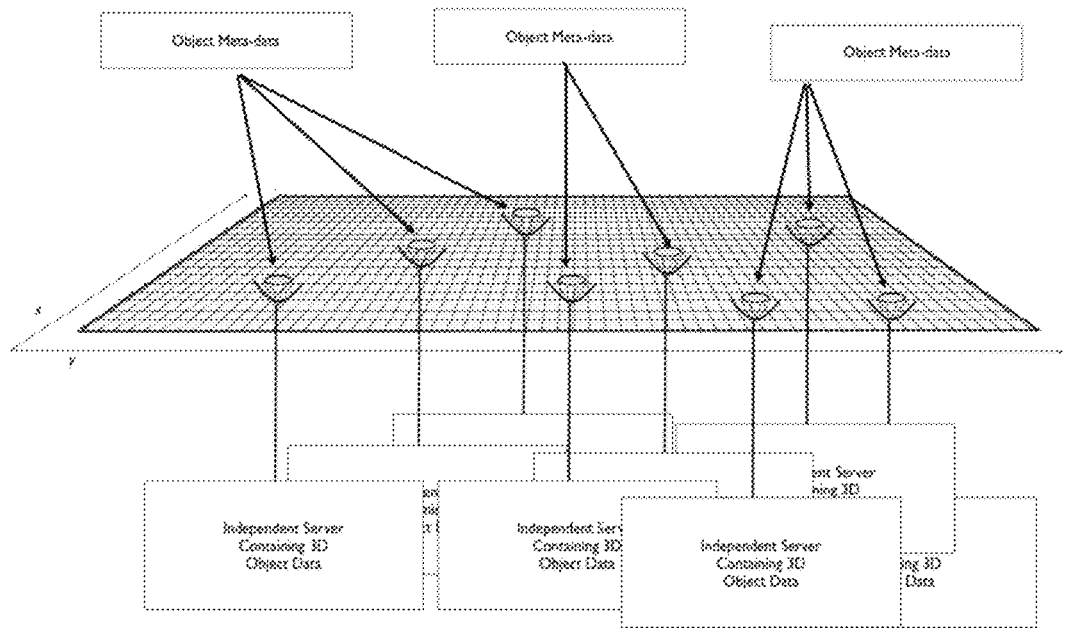
FIG. 3 is an embodiment of a 3D virtual environment with multiple objects located therein.

The directory grid server may access or contain a database of the locations (on the grid as well as source of files on the network) of visual items such as structures and objects and may push user data to those object sources based on user location on the grid (for example as shown in FIG. 3). These sources may transmit data to be rendered by the user instance. In this way, even though a user may not have entered a property and the property server may not be sending data, the user may still see a virtual structure or objects and information on the property as a part of the virtual environment. In certain embodiments, both the user instance and the directory grid server may have access to a cloud based grid. In such embodiments, the user instance preferably tracks the user position and sends this data to the directory grid server to process and communicate to the property servers. The functions of both the assignment server and switchboard may be performed by a single unit or separate units. In certain embodiments, the functions of the assignment server and switchboard may be performed by the render bank and the user may be directed straight to the render bank from 2D websites on the world wide web. In other words, the render bank may receive the user, assign the instance, collect and compile the user data package.

The system and method in which these servers (which may be on a local area network or throughout the world wide web) containing data pertaining to a larger virtual environment communicate and are rendered and streamed to a user allows the content of a network to be rendered as virtual environment (i.e. a visual network environment). Additionally, in the above embodiment, the users' inputs that enable their interaction with the environment are transmitted or "routed" throughout the system and reach source data pertaining to applications, objects and other information which then transmit or "route" data streams to be rendered as the environment and interface on the user instance. The user instance streams video of the environment and the results of user interactions in real time.

In another embodiment, the grid directory server may redirect a user device or a user instance directly to a property server which may result in two-way communication between the user device or user instance and the property server. In this embodiment, the property server may contain source data of applications, objects and other information, and the property server may transmit data as appropriate to the user device or user instance which may render the environment for the user. In this case, a property server may be independently owned and operated, and may be independent of the network.

Zones

In the preferred embodiment, the virtual environment is divided and sectioned into zones. Zones are established spatial areas in the virtual environment that have associated applications and storage space where metadata of other applications and/or data which provide functionality within the zones are stored. Each time a zone is created a zone manager application is preferably duplicated from a source application in the deed and is stored as a sub-directory under a property directory on a property server. Zone managers preferably manage the data in this sub-directory that pertains to the specific zone's dimensions on the grid. Each zone preferably has its own zone manager application and associated storage space. The zone manager preferably stores metadata of apps that are clicked and dragged from the app store to the zone that the zone manager manages. The apps are preferably stored in the zone's subdirectory. In a preferred embodiment, metadata is stored because the executable application is not downloaded by the owner when the app is purchased or otherwise acquired. Preferably, access to the executable source application is granted for use. However, in other embodiments the executable application is downloaded upon purchase or otherwise acquired. Metadata may include, for example, where the source application exists, who can execute the application, and what events trigger the execution of the application (e.g. a specific user input is received).

The zone manager preferably receives data from the property manager application regarding the users. For example the data received by the zone manager may include user inputs, user position on the grid, and user instance location on the network. The zone manager preferably transmits user data to source applications associated with that zone. The apps, in turn, transmit data to the user instance. Data transmitted to source applications may include user inputs, user position on the grid, and user instance location on the network.

Associated apps, whose metadata is stored and managed by the zone manager, preferably determine what can and cannot be done within that zone. For example, an app may be a jump app that allows an avatar to jump. Once an owner has clicked and dragged a jump app to a zone and a user enters the zone, the zone manager accesses the application at its source location. When the appropriate user input, such as pressing the space bar, is received by the source application as an event trigger the source application executes and output data is sent to the user instance to process and stream the animation and camera movement of the avatar jumping. In another embodiment the zone manager application may only transmit data to the application source and does not receive data from the application source. In this example, the transmitted data may include user inputs, user location on the grid and user instance location. When the user leaves the zone they will preferably no longer be able to jump.

In a preferred embodiment, the zone manager may allow, or an app associated with the zone may allow, owners to change which user input triggers an app's execution or features. For example, an owner may have two apps that are by default triggered by the same input (e.g. the user pressing the space bar), the owner may change one app to be triggered by another user input (e.g. the user clicking a mouse button). Other settings may be able to be changed as well.

Property owners can create zones by, for example, selecting an "add zone" option. The selection preferably triggers a "development mode" that presents an overhead view of the virtual property and a set of basic shapes (e.g. square, rectangle, circle, oval, triangle, and trapezoid). User can then select a shape which may remove the other shapes as options and prompt the owner to click and drag on the overhead view of their property in the location where they would like to place the zone. The user can then click and drag the shape to the desired size. Once the shape has been created on the overhead view, the user may be prompted to select anywhere on the perimeter of the shape to manipulate the shape to cover the precise area that the user desires. The user can then add additional shapes that may or may not overlap the previous shape. When the user has created the areas to be made into a zone the user can then select, for example a "create zone" icon. The selection preferably establishes the area(s) defined by the shape(s) as a single zone, ends the "development mode," and reverts back to a first person view. The user can then continue to interact in the environment. The user can repeat the process to create additional zones that may overlap previously created zones.

Additionally, users can edit zones. In an edit zone mode, the view may change to an overhead view and display the shapes of the various zones that have been created. The user can select the zone to be edited and manipulate the shape of the selected zone or delete it entirely. The user can click and drag applications from the app store onto the zone to associate that app with the zone. Preferably, any number of apps can be associated with the zone and/or later removed from the zone.

Zones on a property that have been created by the property owner preferably cannot exceed the boundaries of their property, however properties may fall within a zone established by the environment administrator where functionality applications and rules may supersede functionality apps and rules of zones within a property.

In preferred embodiments, virtual objects can be "converted" to zones. This enables owners to associate applications with objects and create events that trigger the application to execute. For example, a user may select an "add zone" option. Development mode may then begin in an overhead view with standard shapes presented. The user can then select a "convert object" option (as opposed to selecting a shape). The user may choose to return to a "first person" view and navigate to the desired object. The user can then select the object, which may become highlighted, and select to create a zone. The user can then associate a desired application and edit trigger events to execute the application upon, for example a "double click". A visitor can thereafter double click the object to launch the associated application on their HUD. For example, the virtual object may be a radio and the application associated with it may be Pandora. As another example, a file or folder containing many files may be associated with a file cabinet that when double clicked presents the user's stored files and folders.

Additionally, some apps associated with zones may be developed for the purpose of limiting the functionality of the zones or of the avatars to ensure the delivery of the desired user experience. Zones may be developed by associating applications that may limit or enable functionality of the zones or of the avatars in the zones.

Preferably the environment administrator and property owners may associate applications with zones to apply certain characteristics/capabilities which may include sets of human and/or programmed rules and regulations that may be enforced or abided by. This may result in multiple zone types including, but not limited to, property zones (including residential, commercial, knowledge, and gaming zones), and hyperlink zones. Preferably zones and zone types are tools that enable the environment administrators and property owners to create and maintain areas that deliver specific user experiences and in some cases, limitations.

Figure 4:
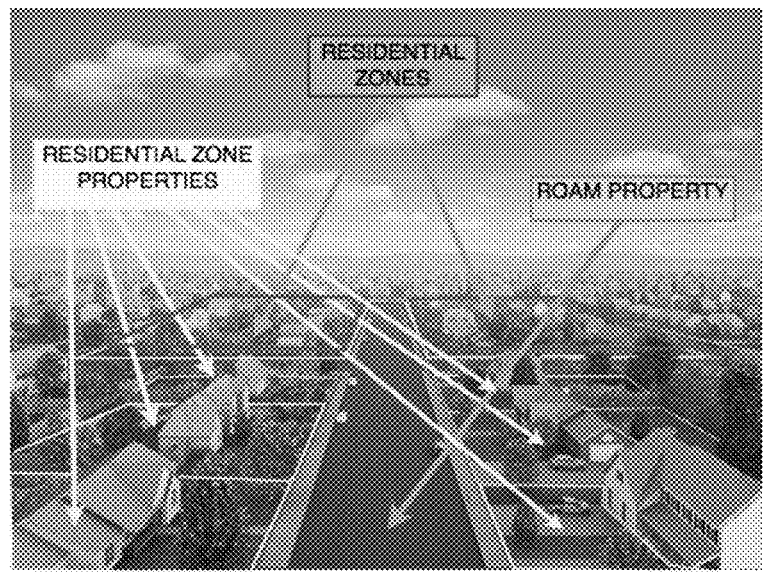
FIG. 4 depicts an embodiment of a residentially zoned area.

Preferably, property zones determine the types of properties that can be constructed within the property zone. For example, as depicted in FIG. 4, residential zones are preferably maintained for users' "houses" or virtual representations of the user's computer (as described herein). Preferably, businesses cannot build stores within residential zones, however users may be able to sell items from their homes under certain, predetermined circumstances. Residential zones may include both individual houses and smaller "apartments" or other dwellings. Property within each zone may be for rent or purchase.

Figure 5:
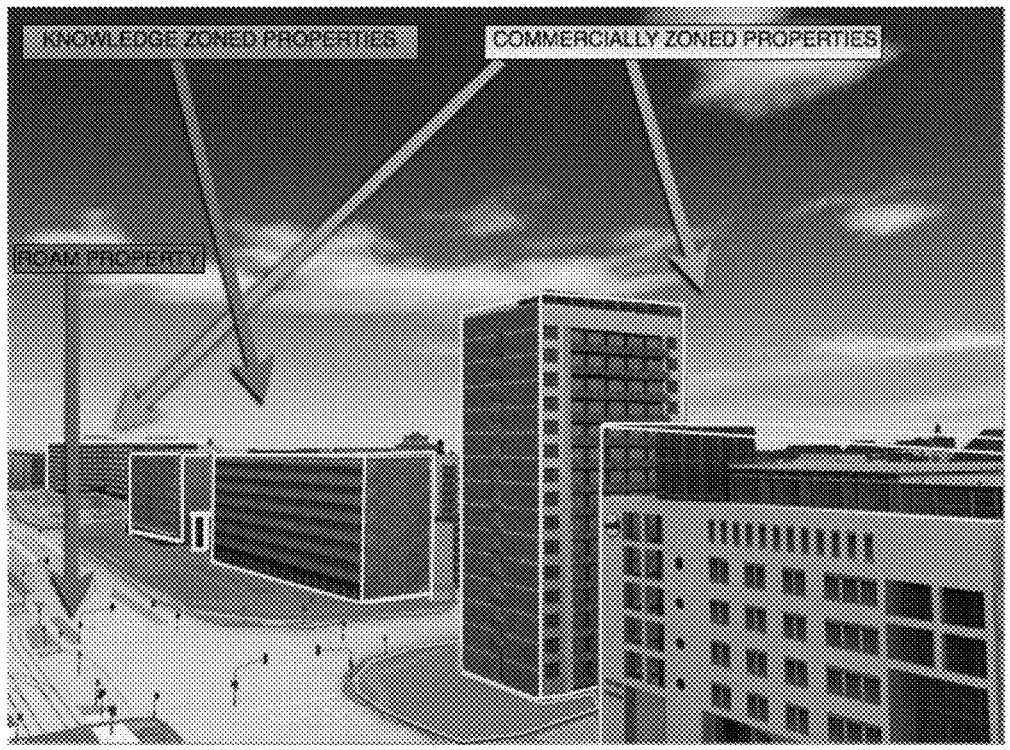
FIG. 5 depicts an embodiment of a commercially zoned area.

Similarly, a commercial zone, as depicted in FIG. 5, is preferably maintained for commercial use. Many types of structures can be built on a commercially zoned property including stores, concert halls, theaters, offices or other structures used for commercial, community, or organizational purposes. Stores, for example, can sell products and/or services to users who enter the property. Preferably, a business can have a number of sales people controlling avatars in the store to communicate with users. Furthermore, multiple stores can be located within the same property as in a virtual shopping mall.

Knowledge Zones are preferably maintained for research and educational purposes. For example, knowledge zones may be limited to museums, libraries, universities, encyclopedia providers, and the like. Knowledge zones may exist within residential and commercial zones. FIG. 5 also depicts a knowledge zone.

Zones associated with a hyperlink application may create what would be called a hyperlink zone. A hyperlink zone is preferably a tool for the developers of properties. Each hyperlink zone is preferably assigned a hyperlink by developers. Hyperlink zones may enable users to activate the hyperlinks, which will direct or link the user to a 2D webpage. For example, an electronics store may have a hyperlink zone for each product. When an avatar is within the hyperlink zone and the user activates the hyperlink, the system may direct the user to the 2D webpage for a product's description and specifications. Preferably, when directed to the website outside of the environment, a user can toggle back and forth between the 3D environment and traditional 2D web browsing. Furthermore, if a user navigates to another web page in the 2D web browser, and toggles to the 3D virtual environment, the user's avatar may "transport" to the location in the 3D environment corresponding to the 2D webpage. Thus, navigation in the 3D environment and the 2D browser correlate. Preferably, developers can add as many or as few hyperlink zones as desired. If more than one hyperlink is associated with a particular zone or two zones overlap, the user will preferable be provided with an option of which hyperlink to follow.

Preferably, there are two ways for the user to activate a hyperlink in a hyperlink zone. The first is to toggle in and out of the environment, that is, back and forth from the environment and the corresponding 2D website or webpage. In this situation the user "toggles" out of the environment, leaving for example the system's website, and going to an entirely different website. The user can from that point toggle back into the system's website. The other option is for the user to open the 2D interface/browser on the HUD (as described herein) which will display the website associated with the hyperlink that the avatar is in. The 2D interface on the HUD (browser) can be resized and repositioned on the HUD. The browser can be "locked" so that as the avatar moves through the environment the site displayed on the 2D interface will not change without user interaction such as clicking a link on the website displayed in the 2D interface/browser. The user can surf the web within this 2D interface as if they were using safari, internet explorer, chrome, etc. If the user navigates away from the site in the 2D interface associated with the hyperlink zone their avatar is in, they can then transport to the structure in the virtual environment associated with the new website they are viewing in the 2D interface (browser). The User can "unlock" the browser as well, which will allow the browser to change as they move through hyperlink zones in the virtual environment, displaying the 2D site or page associated with the avatar's position in the virtual environment.

Zones created in the virtual environment may be associated with and may correspond to an area in augmented reality digital dimension space in the real world. In other words, when a zone is created in the virtual environment, GPS coordinates may be applied or merged with the grid coordinates of the virtual environment zone. Associated application(s) (or metadata of other data) that enable accessibility or parameters for that zone then apply to both and may be visible to an individual using an augmented reality (AR) device in the real world.

For example, a user may have, in the real world, an augmented reality device such as AR glasses, which may present the wearer with the user's virtual environment HUD overlaid on the real world. A store owner in the virtual environment, who owns a store in the real world, may associate a zone in their virtual environment store, and its associated apps and HUD display information, with a zone in the real world defined by GPS coordinates. In this way, if a user enters the store in the real world, their AR glasses will present similar information and applications that are displayed on the user's HUD when they enter the virtual store in the virtual environment. As an example, an owner can establish a zone within their virtual store and "associate" or "merge" the zone with GPS coordinates in the real world. Using a HUD editing application, the owner can then develop a HUD presentation delivering core value propositions of their business that is triggered when a user walks into the zone in the virtual store. When a user enters the GPS "zone" in the real world wearing AR glasses, the same HUD display, delivering core value propositions of the business, is also presented to the user. To create and edit zones, and perform other development activities that affect the property, the owner can use development applications and tools existing in the deed suite of applications (as described herein).

AVR/AR Editor

Augmented virtual reality (AVR) is information throughout the environment that may appear as translucent, floating information and may be stationary and have a set size relative to the environment. This is similar to augmented reality (AR) in the real world. With AVR, when a user is within range of the object (i.e. in its zone), but further away from the object, the information may appear but will be a distance away from the user. As the user moves closer, the information, along with the object itself, may get closer. Users may be able to adjust what AVR information is visible in the environment. For example, users may, using an application on the HUD, cause certain types of information to be visible that has been created as AVR throughout the environment by other users.

An application called, for example, the AVR/AR Editor may enable the owner of a property to create floating text, images, videos, links, and other information that can be seen by users when they enter properties, zones, select products, select other objects in the virtual environment, or otherwise interact with the virtual environment. The owner can create this information by creating floating "mini-websites" and associating them with an object or zone. The owner may be able to then position the mini-website as desired within the virtual environment. For example, an owner of a property may open their AVR/AR Editor and use tools in the application to select an object. The owner may then be presented with an option to create an AVR display. The AVR display may be a small "blank page" floating in the virtual environment above the object. The owner may be presented with options to resize, reshape, and move the AVR display. The owner may be able to create or paste HTML script into the blank page. The script may produce the effect of a floating piece of information relevant to the object (e.g. the object's price) when a user visiting the property selects the object; or the effect can be more interactive. For example, the effect may bring up a presentation of value propositions when a user enters the associated zone, the effect may provide images or buttons that can be clicked to provide more information or purchase options for a product, or the effect may be to enable a user to click "play" on a floating window that will play a video from somewhere else on the web.

The purpose of the AVR/AR Editor is preferably to enable property owners to effectively deliver interactive information to visitors, or to provide temporary access to tools, services or functions that a user may not have acquired on their HUD or another zone on the property. The effect preferably creates floating, translucent information that can be interactive and may be a component of the augmented 3D landscape throughout the virtual environment. The effect may mimic advanced concepts of augmented reality in the virtual environment. In the preferred embodiment, files and images created in typical web development applications and graphics editing programs are able to be placed and interacted with throughout the virtual environment to provide an interactive augmented reality effect. In the preferred embodiment, the data pertaining to the "mini-websites" associated with the objects and areas in the virtual environment are stored on storage space associated with the user's account (e.g. in the property server, personal cloud storage, or other associated storage).

Figure 13:
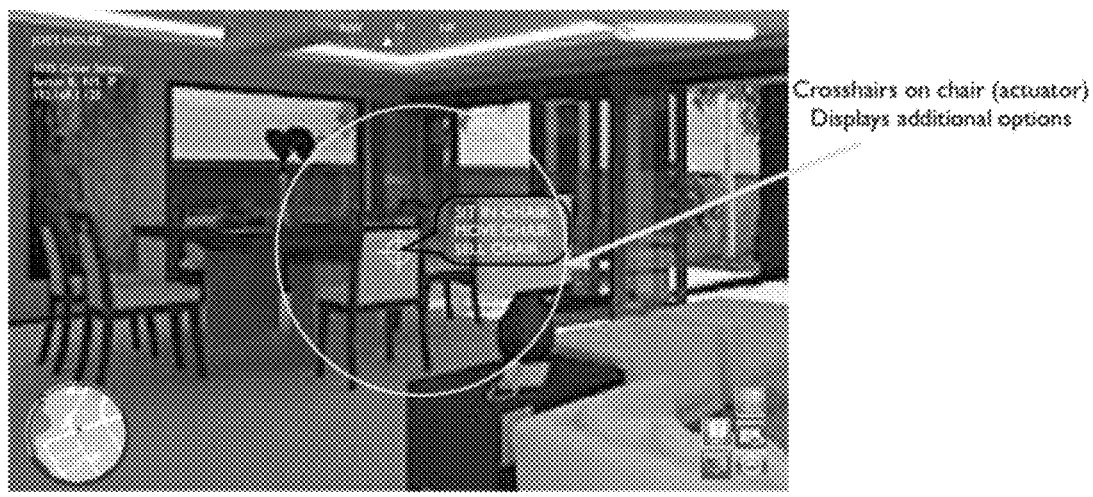
FIG. 13 depicts an example of an actuator object.

Preferably the system employs actuators, or objects that avatars can interact with within the virtual environment. Such objects preferably display interaction options when selected or otherwise triggered by the user (e.g. via a mouse over, mouse click, or as the object enters the avatar's spheres (as described herein). FIG. 13 displays an example of an actuator object.

2D and 3D Web Traffic—Shared Traffic Market

Preferably locations within the virtual environment correspond to existing, traditional websites or web-pages on the World Wide Web and represent a traffic inlet for the virtual environment. However, each virtual property may not have a corresponding 2D website.

Each property preferably has a file that contains a standard HTML script containing a unique hyperlink to the property in the virtual environment. When a property is purchased, the file is provided (e.g. via email or another electronic transmission) to the new owner. The owner may then copy the script into the HTML source code of their standard 2D website(s). When the 2D website is visited, the visitor may be given the option to view the site in 2D or 3D. If the visitor selects 2D, they will proceed to the 2D website. However, if the visitor selects 3D, they will preferably be redirected to the property in the virtual environment. When a user originating from a corresponding 2D website is detected, the first view is preferably of an aerial perspective that reveals the larger virtual environment and moves in to the property and finally to the view of a basic/generic avatar created for the user to navigate in the 3D environment.

Additionally, script files are provided to owners for use on various social networks. Such script files may enable users who have property in the virtual environment to offer visitors to their profiles on other social networks the option to view their 3D property such as a store or personal virtual home.

In the preferred embodiment, businesses will desire to purchase or rent property within the virtual environment that experiences a high degree of traffic. For example, if two large retailers have stores located within the same "street" in the virtual environment, users will be likely to move their avatars between the two stores. Property between the two stores will be desirable because the users' avatars will pass by those properties while navigating between the two large retailers' stores. Such location based demand is similar to real world real estate. More desirable properties may cost more to buy or rent. In certain embodiments, the system is able to expand the number of properties thereby creating more properties in desirable locations. In other embodiments, the system may only add more properties at the edges of the virtual environment.

The combined traffic of all inlets preferably creates visual flows of network traffic within the virtual environment that adds value to properties that are among or exposed to the traffic. The combined "hits" of all of the properties in the virtual environment are users visualized as avatars. They are what populate virtual environment with visual traffic flows and add value to the virtual real estate. This consolidation of web traffic from thousands of websites, now visualized as avatars in an "open world environment," can move through the virtual environment from store to store. Properties exposed to this traffic are attractive to businesses and increase in value. Each new structure brings with it the traffic of its corresponding standard 2D website which, in turn, increases the population density in that area, attracting new businesses, new structures, new traffic, more value, and so on, thereby creating a cycle of growth.

Preferably, this "Shared Traffic Market" is a compounding and exponential growth model, essentially self populating; even at very low point of critical mass. The shared traffic market is the combination of a virtual environment made up of properties owned by businesses and individuals that enables direct links to those properties from corresponding web presences (existing 2D websites) of the businesses and individuals that own the properties, resulting in the effect of extending the business' or individual's existing 2D web presence into the 3D open world environment. The result is the redirection and consolidation of the web traffic of those web presences into the virtual environment. The generation of graphical representations (avatars) of each redirected user that users control to navigate through the virtual environment (open world environment) generates visual flows of traffic exposed to the virtual properties.

The shared traffic market preferably generates more traffic than any one website would produce on its own. The visible traffic flows through virtual streets and can be marketed to by businesses with window displays, signage, curb appeal and other brick and mortar marketing techniques. Properties can be priced and purchased based on traffic count. Properties preferably have value that can be purchased and sold. The concept enables the equivalent of purchasing a domain name that has a steady flow of traffic to begin with.

Heads Up Display (HUD)

The HUD is preferably the user's personal and customizable 2D user interface for the user's applications. Currently, on typical personal computing devices a desktop or home screen is a location for the user to place icons representing applications, folders, files, and the like. Typically, there is a desktop image background (i.e. wallpaper) that users can customize. The wallpaper is a background layer and the icons are on a layer on top of the background.

The HUD, on the other hand, is a translucent second display overlaid on the virtual environment that provides a location to place HUD tools and the user's applications. These applications may enable the user to interact with files and folders stored in storage space associated with the user's account, such as a property server, personal cloud storage, or other associated storage. The applications may have been purchased by the user from an app store or may have otherwise been obtained and stored in the storage space. Some applications may be web applications that present information about the virtual environment to the user. For example, a map HUD tool may show a user where they are in the virtual environment. The applications may be sourced on other servers and the user's storage space may contain metadata pertaining to the application and its location.

The HUD preferably produces a desktop-like effect on the virtual environment or the VNE that moves with the user throughout the environment. Preferably, the HUD is fixed in the user's field of view and moves with the user as they move throughout the virtual environment. Preferably there is no background. Instead, the virtual environment is the "wallpaper." The HUD may also have control options that affect the HUD visually.

The HUD experienced by a visitor or user of the virtual environment comprises the HUD, a variety of HUD tools (including, but not limited to, system menus, an applications store, a map, a compass, a communication and collaboration center, a search and web-surfing tool, a help center, and a desktop viewer), and potentially a plurality of other applications that may have been obtained by the user from the app store or otherwise acquired. Preferably, the system has speech recognition capabilities and has input shortcuts for quicker control of HUD tools.

Figure 6:
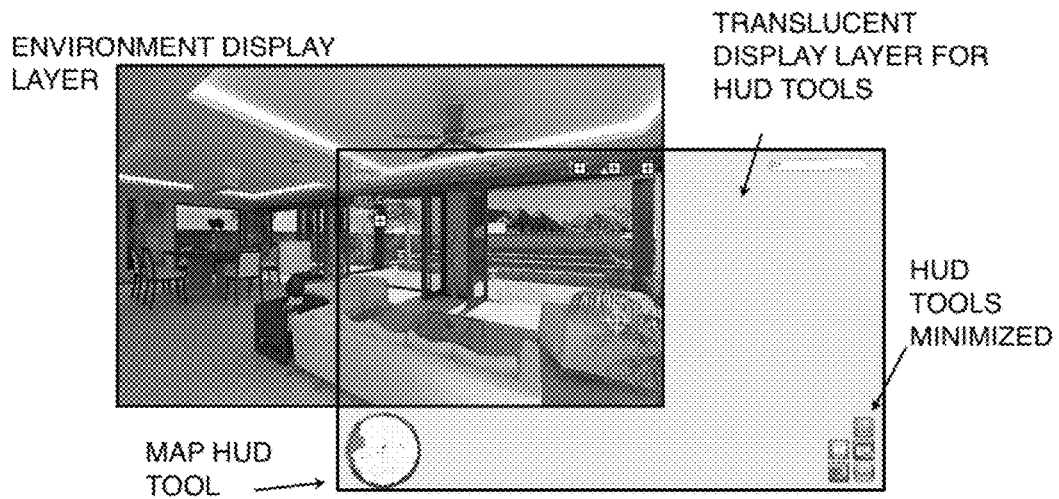
FIG. 6 depicts an embodiment of a heads up display (HUD).

As depicted in FIG. 6, the HUD is an interactive and translucent display layer superimposed on top of a user's current view of the virtual environment. The HUD provides a location to place HUD tools that deliver access to a variety of information and control options for the user. Preferably, a user can decide which HUD tools are displayed and can customize their HUD display as desired. In certain embodiments, at least one tool displayed on the HUD is fixed or set in position by the system. Furthermore, certain areas on the HUD may be reserved for displaying tools.

Figure 7:
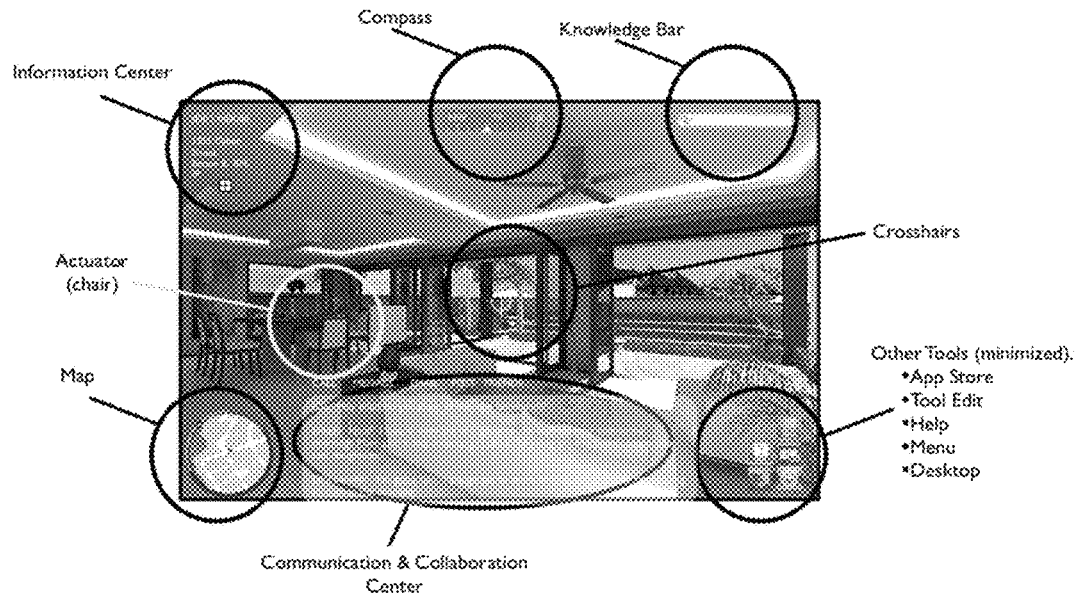
FIG. 7 depicts another view of a HUD.

HUD tools preferably allow a user to quickly access a variety of information and control options. An embodiment of a HUD display is depicted in FIG. 7. Preferably, HUD tools can be resized and positioned as desired by the user. Additionally, HUD tools may have brightness and opacity settings to alter the brightness and opacity of the HUD tools against the background of the 3D environment. HUD tools preferably can be expanded, closed entirely, or minimized to take up a smaller portion of the screen.

Figure 8:
FIG. 8 depicts an embodiment of a system menu within the HUD.

One example of a HUD tool is a system menu, an embodiment of which is depicted in FIG. 8. The system menu can be activated by selecting an icon in the HUD. The system menu may include information, interactive settings, and controls for a variety of system settings (e.g. audio, video, control, and graphic settings). Additionally, the system menu may allow users to edit account information or profile settings, and review purchased items.

Another example of HUD tools are maps and compasses. FIGS. 14*a* and 14*b* display two embodiments of the virtual environment maps and compasses. The map preferably shows a user their avatar's location within the virtual environment. The map can be a 2D aerial street view (as in FIG. 9*a*) or a 3D angled aerial view with terrain and buildings projecting from the street level (as in FIG. 9*b*). Preferably, selecting a point on the map will teleport the avatar to the location selected. The compass preferably shows a user the direction their avatar is facing. The map and compass may be positioned together or apart on the HUD.

The HUD may also have a communications tool that provides a variety of communications features. For example the communications tool may provide access to email, text, and/or voice and video calling. Additionally, the system may provide access to social media (e.g. Twitter or Facebook) for sharing a user's thoughts, photos, videos, links, files, and the like. In other embodiments, the system itself is a social media site that would compete directly with other social media sites. Social media activities will take place within the virtual environment. For example, users would login to the virtual environment to view messages, posts, images, etc. The communications tool will preferably be constantly updated as the user navigates the virtual environment. Additionally, if one avatar approaches another avatar, the users of the two avatars are preferably able to communicate directly using a device's microphone and speakers or via instant messaging. Users are preferably able to exchange files. For example, one user could "give" a business card to another user. This card would look like a real world business card and may be scripted to update the recipient's contact list with the new information. Documents, files, and applications are preferably transferable from one avatar to another.

Additionally, the HUD may have a search and web surfing tool to allow a user to browse the internet in a traditional 2D interface. Preferably, when a user views a 2D site in the 2D interface, the user can go directly to the corresponding 3D site in the virtual environment. Likewise, if a user opens the 2D interface while in a 3D site, the 2D version that corresponds to the 3D site will open in the HUD.

The HUD may also allow users to access their desktop, for example as displayed in FIG. 10. For example, users can select an icon, which activates a window within the HUD that displays the user's desktop. Users can then, for example, drag items (e.g. photos, videos, files, or applications) from their hard drive into the virtual environment.

Other features that may be available to users may include, but are not limited to hotkeys (which can be set to perform specific functions), speech recognition (which provides voice control for tool and actions), and help tools. Help tools may include instructional videos, documents, tutorials, and/or workshops. Workshops may include live instruction and collaboration with system employees or an independent business' employee. Help topics may be browsable or searchable.

Apps (Applications and Objects)

Figure 11:
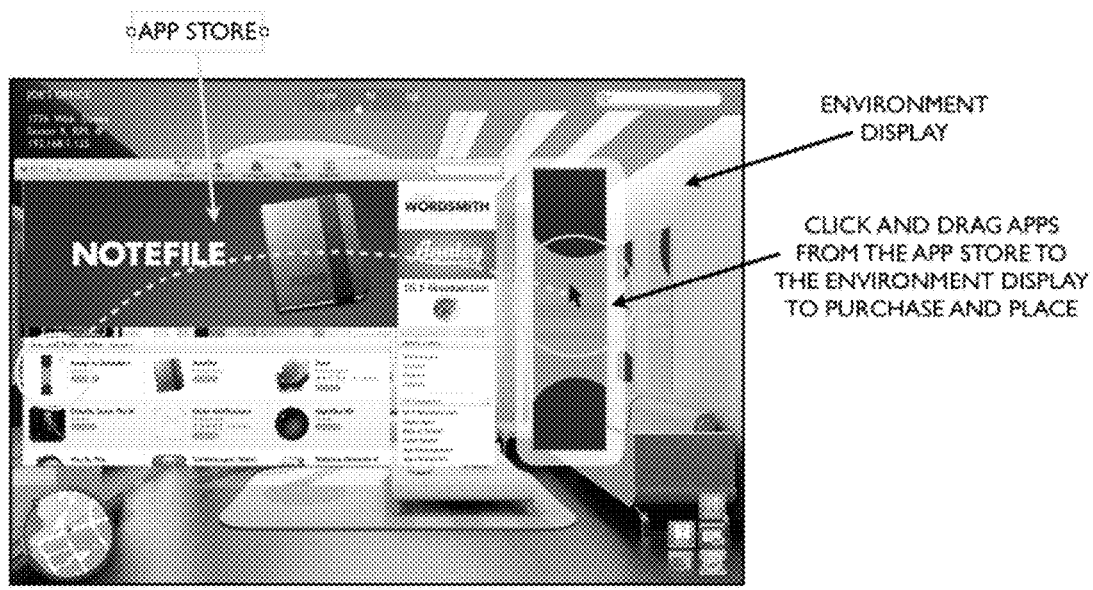
FIG. 11 depicts an embodiment of an applications store.

In the preferred embodiment, users have access to an app store (or another database of applications) through the HUD (as displayed in FIG. 11), where user can browse and search for apps available to purchase. While the term purchase is used, apps may be free or have a specific cost. The app store is preferably a marketplace for developers and users to sell and purchase apps, respectively. The integration of applications and information into the virtual environment occurs as new apps are developed, purchased, downloaded, and used. The apps can be developed by individuals, developers, and/or businesses. In certain embodiments, apps have to go through an approval process prior to becoming available in the app store. In the store, apps are preferably categorized and searchable. In the app store, users can select an app to obtain more information about the app and decide whether or not to purchase the app. Users may be able to rent or try apps as well. When a user clicks and drags an item from the app store, the system preferably knows "who" wants to place "what" and "where" they want to place it. The system can then generate the transaction and perform the desired function.

Object apps are things that can be seen and have a three dimensional form such as a structure (e.g., a house, store, library, theater, etc.), or an item (e.g., virtual sofa, lamp, piece of art, tree, car, a football, etc.). Examples of structures include a store (which can sell virtual and/or real world products) or a house. Functions, can be, apps that contain lines of script that allow avatars to jump, run, or do other actions in the virtual environment. Applications are of three types: service, functional, or utility. A service app, for example, may be file storage or sharing services, payment services, and the like. The system may also be able to run separate operating systems within the virtual environment. For example, a user accessing the virtual environment through a Windows based system may be able to purchase an application that runs a Mac operating system in the virtual environment (or vice versa). Another example of a separate operating system running within the virtual environment is a gaming system (e.g. Playstation, X-Box, or Wii), where users can play games, which only run on the proprietary gaming system, through the virtual environment.

Furthermore, the system may have functional applications. For example, there may be a 3D virtual football, which, when in possession of an avatar, allows the avatar to run, throw, tackle, or other movements. Another example of a function application is a virtual phone, which may allow users in the virtual environment to call real-world phone numbers. In another embodiment, the system may be able to allow users to view and interact with another computing device. For example, a user accessing the virtual environment on their computer may be able to access, use, and/or view programs or files on their tablet computer or smartphone.

A utility application is an application that assists a user or the system in accomplishing a certain task. For example, a calculator HUD tool, a calendar, a spreadsheet, a dictionary, etc.

In certain embodiments, specific applications will only be accessible or useable in specific locations within the virtual environment. For example, a 3D modeling application may only be accessible in a modeling studio, a video playing application may only be accessible in a virtual theater, or a game may only be accessible in a virtual arcade.

The integration of the app store creates an environment where people and businesses can create and integrate applications, objects, and functions into the virtual environment. Thus, integrating web traffic, websites, applications, and information into a single collaborative, intuitive, and constantly evolving environment on the internet.

Some objects may have their own interface or operating system separate from or within the operating system of the virtual environment (e.g. a windows based virtual computer).

Figure 12:
FIG. 12 depicts an embodiment of a view of an application within the virtual environment.

The collection of apps available in the store preferably populate the virtual environment with objects and provide additional functionality to the virtual environment, as displayed in FIG. 12. Each icon preferably represents a file containing metadata pertaining to the actual source file of the app which is preferably stored on a separate server from the app store database. When an app is clicked and dragged onto a user's property, zone or HUD, the app's metadata is transferred to the storage location pertaining to the desired location (i.e. where the HUD, zone or property data is located). Apps can be, for example, 3D objects, structures, functions or scripts that have an effect on objects and zones, applications or collections of scripts, objects that represent applications, objects that represent functions, structures with applications and functions as a package, or combinations thereof.

Users

In the preferred embodiment, anyone with access to the internet can become a visitor to the virtual environment. However, in order to be able to fully interact with the virtual environment (e.g. buying and selling property, product, and services), users (both individuals and businesses) are preferably required to set up an account with the system. In setting up an account, users may be required to provide contact information, credit or debit card information, and other information. Such information will preferably be used for purchases within the virtual environment and for levels of access to the virtual environment.

Additionally, users may be prompted to set up a profile. The profile is preferably visible to other users, although users may be able to opt out of having their profiles be publicly visible. In setting up a profile, a user may be able to provide contact information, upload pictures, videos, and/or personal information (e.g. birthday, age, gender, tastes, and/or hobbies). Furthermore, users may be able to link their accounts to social media accounts (e.g. Twitter or Facebook). Moreover, users can preferably customize their avatars. An avatar's clothing, appearance (i.e. skin tone, hair color, or eye color), and other aspects may be able to be chosen by the user. Certain customizations may only be available by purchase. Profiles or accounts may be linked with a dedicated amount of storage space. The storage space may include a property server in which the user can store data and/or metadata pertaining to properties acquired in the virtual environment.

In a preferred embodiment, the system may award users experience points and/or promote users to higher levels. For example, when users accomplish tasks and/or use functions, the user can accumulate experience points in a variety of categories and once a predetermined number of experience points are accumulated, the user can be promoted to a higher level. Preferably, levels and experience points will be visible to other users. Additionally, the system and/or other users may award trophies or other awards upon completion of certain tasks. For example a business may award a user a trophy for connecting the business with a customer. Trophies may also be awarded based on votes from other users (e.g. for best structure or most creative avatar).

Property

As described herein, users may be able to purchase or rent (or otherwise control) land (or other portions of the virtual environment) within the virtual environment. The system can encompass one or more pricing schemes to sell and/or rent property. A virtual environment comprised of consolidated traffic (shared traffic market model described herein) from a multitude of websites and visualized as avatars that move through the environment from business to business passing properties produces a market of virtual properties which fluctuate in value based on exposure to traffic flow and further developments in the environment that attract users, i.e. points of interest or popular retailers. A specific and market stabilizing pricing model that is adaptive to market fluctuations is needed.

In a preferred embodiment, the system tallies a property's exposure to traffic (i.e. a user who passed the store on the virtual street but did not enter the property) and calculates a fee based on the number of users exposed to the property.

The system may then calculate the sum total of the amount of time spent by users in or on the property at a rate of Y per unit of time. The system may then apply a "commission" or "fee" on completed sales as a percentage of total sales. The system preferably tallies each component fee into a single fee for each property resulting in pricing (which may be daily, weekly, monthly, etc.) that may be unique to each property and reflect the fluctuating value of the individual properties in the shared traffic market, the flows of traffic in the virtual environment and the behavior of the users in it. Additionally, this single pricing model of three separate components keeps pricing in balance with demand.

When a user obtains property, the user can purchase pre-designed structures to place on the property, hire developers to create a structure, or create their own structure with proprietary developer tools. Structures include stores, homes, buildings, and the like. When a user builds a store, for example, the user can present products for sale and interact with customers. Additionally, employees of a business may place productivity applications in a private office within the store to facilitate their online work. For example, conference rooms may provide fully collaborative zones for employee meetings, private meetings with customers, or full presentations to a group. In certain embodiments, the virtual properties can be purchased, sold, rented, leased and traded between users, businesses, and/or other entities.

In the preferred embodiment, when a property is obtained a suite or set of applications (for example, called a "Deed") pertaining to the property coordinates on the grid has also been obtained and is then stored in the user's property server. In the case of a rented property only access to the deed is available for the renter. When a party sells a property to another party, preferably the deed is electronically removed from the seller's property server and transferred to the buyer's property server. The new owner of the property now has access to the deed and the seller can no longer access the deed. The applications in the deed preferably enable the owner to effect change to that specific property and that property only. For example, the owner can place structures on the property, create and edit zones on the property, place objects on the property, store and/or associate applications and metadata pertaining to applications, store files, edit HUD displays that are viewable by visitors to the property, and other changes that effect the property or the property visitors' experience.

The deed and applications comprising the deed suite of applications preferably compile and maintain files, applications and other data and metadata resulting from the owner's property development activities and stores this data in a directory pertaining to that property on the property server. For example, when a user clicks and drags a virtual object from the app store, the object data or metadata (e.g. location of the source of the data) is filed in the directory associated with that property.

In a preferred embodiment when a visiting user enters the property, the property server preferably receives the user data from the directory grid server. The property server then routes that data to the appropriate deed on the property server. The deed by default routes the data to the property manager in the deed's directory. Preferably, for each property that is purchased, a new deed is moved to the property server and the applications associated with the deed manage a new directory and associated property When a deed (or property) is sold, in the preferred embodiment, the items and data in the directory can be sold with the deed or the seller can move items out of the directory to other properties before selling the property. Additionally, the seller can preferably store items on the property server that are not in a property directory for the occasion in which a seller wants to keep an object, application, or some other data but does not want it on another property yet. In a preferred embodiment, a directory can be "shared" with other users (e.g. in the case of a rented property). In such situations, the owner of the property can select what is available to the tenant and what is locked or not viewable.

A deed preferably contains the directory and sub-directories of data and metadata pertaining to the property. It may also contain a property manager application that contains or accesses the portion of the grid that the property covers. The property manager maintains a directory which may be a sub-directory of the deed. The property manager preferably receives routed data from the deed and routes data to appropriate items in the property manager's directory. Items may be applications such as a zone manager application with its own sub-directory of app metadata, etc.

A deed may contain a deed card. The deed card is preferably an application in the deed suite with an interface that can be displayed on the owner's HUD. Deed cards may contain important analytics for the owner regarding the property. For example the deed card may display real time traffic count on the property, traffic count on the street that the property is connected to, demographics of the visitors, average time spent on the property, and other information concerning the property, visitors, and the surrounding virtual environment. Deed cards may also provide comparable property pricing based on averages of similar properties for sale. The data on deed cards can preferably be selected to provide more detailed information and interactive information. For example, the owner may select the traffic count to present a graph that shows traffic count over specified time periods to reveal fluctuations in traffic based on periods of high traffic (e.g. "rush hour"). An owner may rent property to other users or businesses. In such situations, the deed cards may be shared with the occupant.

Properties may be sold, rented, or otherwise exchanged with or without the structures, objects, and applications associated with the property. By selling a property with a business on it and including the directory, turn key businesses, with existing clients and supply chains included, may be sold. Deed cards may also provide important information pertaining to a business on the property that is associated with the owner's account, such as historical sales, pending transactions, and the like. Deed cards may have a "sell" and/or "rent" button that can be clicked and later confirmed, which will post general property and/or business information to a searchable database available to users and businesses, who can search and browse for properties to purchase or trade. The searchable database may allow users to search by price, traffic count, proximity to a specific point in the environment, brand, demographic concentration, or other property attributes. Property auctions may also be possible where users bid to obtain properties. Deeds for businesses may be associated with real world businesses and appropriate legal purchase agreements of the corresponding real world businesses.

Homes

When a user is authorized to develop a residentially zoned property, one of the structures that can be built is a house. Purchasing a residential property is preferably the equivalent of purchasing a piece of a secured network. The property and the home on it are, for example, a graphical representation of the user's cloud computer (in the same way the user's avatar is a graphical representation of the user). The residential property and home are preferably the personal property of the owner, as is the objects and data in them. However, in other embodiments, users rent the property and home from the system. In rental properties, preferably, the objects and data may be still owned by the user. Houses can store email, productivity applications, social network data, and other personal functions, applications and activities. Preferably, the owner of the property can decide who can enter the property and home. In the preferred embodiment, the system maintains the data of each user's house on a local server.

In the preferred embodiment, users may be able to sell items from their houses. For example, individuals can sell things through their "garage sale" store at their home. Users can connect directly with the sellers via the communication tools to discuss products. A garage search will allow all users to see all available products that other users are selling (similar to online classified ads). The system may require users to purchase commercial space once a predetermined threshold of sales is met or a covenant is broken.

Users can purchase pre-designed houses to place on the land, hire developers to create a house, or create their own house with proprietary developer tools. Rooms and floors can preferably be added provided the dimensions of the house do not exceed the dimensions of the property. Additionally, once built, a house can be decorated with virtual art, music, furniture, or other decorative features.

Developing a home using the app store to click and drag objects and applications into the home and property, gives the user their own "place in cyberspace," a familiar place to make their own and visit from anywhere in the world to access their files & apps. It's their "home" on the web.

The owner of a residential property and its associated storage space, such as its property server, may create and develop their properties in the same ways as other properties are developed in the environment (such as a store). For example, the owner of a residential property can create zones on the property and in the home and associate applications with those zones.

Rooms are intuitive storage locations for the user's digital personal property such as their applications, files, folders and the like. For example, a room in a home may be developed into an office by storing productivity related applications, files and folders in that room. That room and the applications, files, folders and objects in it may be stored in the property server as a sub-directory called "Office" in the directory "Home" which may exist under the property manager directory for that property. An object in that room, such a virtual 3D file cabinet may be stored as a sub-directory "File Cabinet" under the sub-directory "Office." "File Cabinet" may be a directory of the owner's folders and files in those folders. Preferably, when a user clicks and drags the file cabinet virtual object from the App Store into the office, the file name "File Cabinet" is added to the sub-directory "Office." Preferably when the user drags a file, which may have been created using an application such as a word processor on the HUD, onto the file cabinet object in the virtual office the user may specify the name the file will be saved as. This would save the file under the sub-directory "File Cabinet" because the user clicked and dragged the file onto the file cabinet.

Another example of a room may be one that is developed into a "Living Room." A user may develop a living room by storing objects and applications such as a virtual TV that connects with streaming video services like Netflix, Hulu, and YouTube, or a bookshelf to store e-books. These applications and objects, again, are organized in the directory system on the property server pertaining to that property.

In a preferred embodiment a user may, on their HUD, be able to interface in a familiar 2D manner with the files and folders in their storage space organized in their directory. Additionally, a user may be able to see and interface with this 2D directory while viewing the 3D virtual room and selecting an item in the directory, which may "highlight" the item, also selects the object in the environment and may "highlight" that object. Similarly, selecting an object in the environment may highlight the object and also highlight the associated item in the directory.

The movement of files in the directory effects movement in the environment. For example, if a user selects an item in the directory which may be the sub-directory "Bookshelf" under the sub-directory "Office" and moves the directory item to sub-directory "Living Room" the virtual object in the environment would no longer be found in the office but would be found in the living room. The user would then position the bookshelf in the living room as desired using the 3D interface as opposed to the 2D directory interface on the HUD. Similarly, an object moved in the virtual environment relocates that object accordingly on the property server. (This type of organizing and interfacing preferably applies to all properties in the virtual environment).

Users may affect sharing settings for properties, structures, rooms, objects, applications, folders, files and documents. These settings may allow public access, specific user access or only private access. A room may be public. A file cabinet in the room may allow only the user's friends to access its contents while certain files in the cabinet may be for the owner's private access only. In this way, a user may make the property and the living room in their home public while making all other rooms private. A user may add another user to a private room to allow them to enter. For example, if the owner of the property has a child they may allow the child to access a child's room that stores the child's games, homework, objects, movies, etc., while not providing the child access to specific private rooms such as an office where work and productivity related objects, applications and files are stored. Additionally, rooms may have one or more closets which can be used to store files and applications out of sight.

Because the user's home exists in the visual network environment, it preferably becomes an immersive social media location where the user's friends, family, and colleagues can visit and interact with each other as well as interface with shared applications, photos, videos, etc. Applications associated with zones in the home may allow collaborative activities such as white boarding in an office. Multiple users can meet in an office to conduct collaborative activities.

The user instance and the user's associated storage, comprised of their property server, personal cloud storage and any other associated storage represents a cloud computing capability for that user. It is their cloud computer. The home, rooms and objects, as well as the HUD with its ability to interface with applications and documents and any integrated AVR that the owner has incorporated throughout their property, together are preferably the visual interface user for their cloud computer. The home is preferably the location where the user places objects acquired that represent any cloud based computing services or other web services acquired or subscribed to by the owner. It's a place for the user to consolidate all of their digital possessions in a private visual environment.

Commerce

Figure 14:
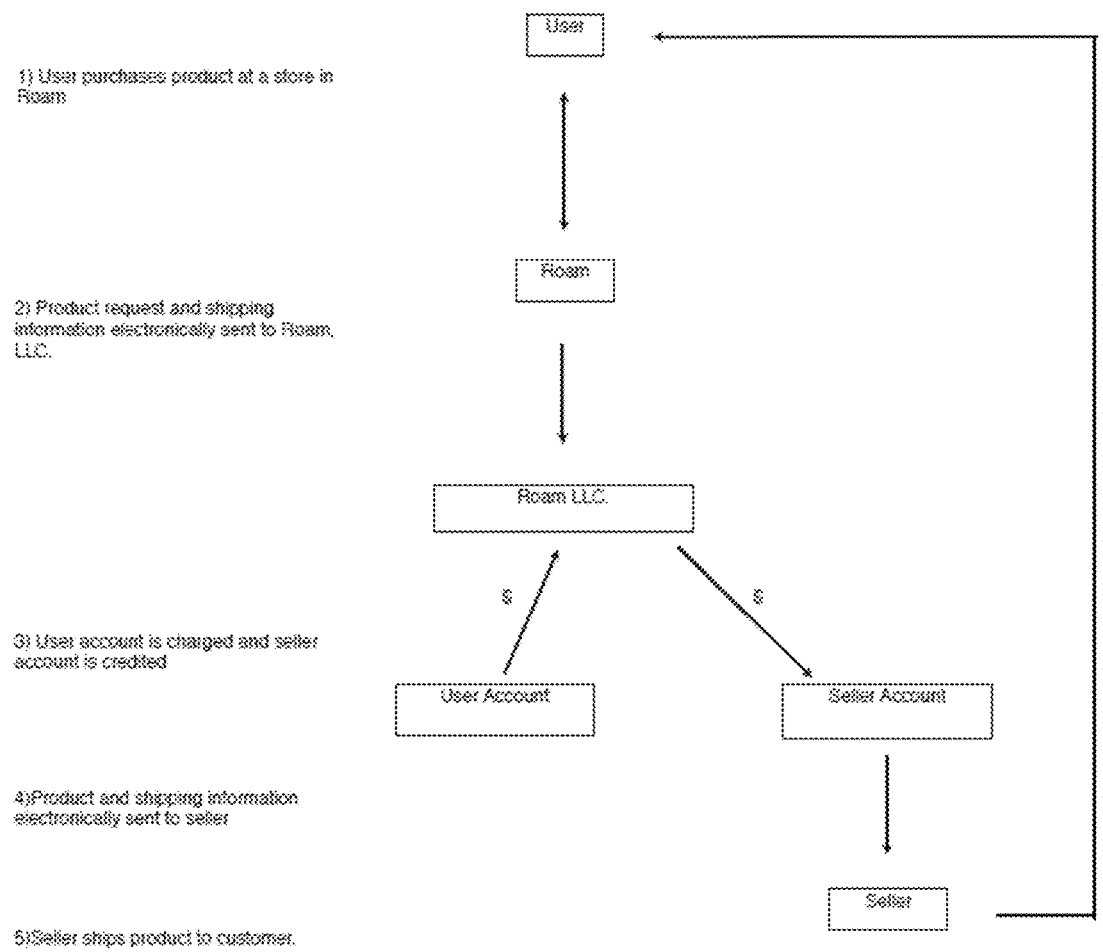
FIG. 14 is an embodiment of a flow chart for conducting a sale within the virtual environment.

To facilitate the purchase of apps, property, and real-world products, the system preferably accepts a variety of electronic payments on behalf of the users and stores. Preferably, the system will act as a liaison between purchasers and sellers, thereby allowing purchases without purchasers being required to enter their personal banking information for each transaction or purchase. Preferably, when a buyer purchases a product, the item request and shipping information is electronically sent to the seller and the system charges the buyer for the product and credits the seller's account. FIG. 14 displays a flow chart of the purchasing process.

Preferably, the system acts as a third party to all sales. No merchants receive a user's private banking information. Shopping in the environment is preferably safe and secure. Users preferably don't have to enter payment and shipping information every time they purchase a product. Transaction facilitation is inherent throughout the virtual environment. Users can preferably buy and sell both digital and real world products online without the hassle and expense of merchant software, payment card processing, and PCI compliance. Straight money transfers may also be able to be processed.

Additionally, the online transaction process of crediting and debiting user accounts may enable more complex transactions. For example, when a user purchases a product or service in the virtual environment, the purchasing user's account may be charged and multiple accounts may be credited.

A user or business with a real world product for sale may create, commission the creation of, or use a preexisting virtual likeness of the product in the form of a virtual object. That virtual object may be priced and be associated with the seller's account. The object can be submitted to the app store or can be placed in the virtual environment upon property owned or occupied by the seller. When a user approaches the object, associated AVR may provide a purchase option for the user. When a user selects "purchase" the online transaction process performs the transaction and supplies the seller with shipping information for the real world product.

Virtual objects that may represent a real world product and may be found throughout the virtual environment and/or in an associated digital marketplace or the app store may also represent an associated supply chain. The virtual object representing the real world product may be proliferated to other virtual retailers throughout the virtual environment via the app store. A second business may click and drag the virtual object, representing the real world product, from the app store into their virtual structure for their visitors to see and purchase. This second business may associate the product with their account and re-price the object as they desire. When a user purchases the product from this second store the purchaser's account is charged the new price and the "purchase" is forwarded to the seller who has the actual real world product, crediting their account and providing shipping information to complete the sale. The difference in cost from the original seller and the new cost from the second seller is credited or debited to the second seller's account. (It is assumed that the second seller would re-price to accommodate a profit.)

The owner of a virtual object that represents a product may edit values of the product to apply commissions on the sale of the product. For example, a user or business selling a product in hopes of proliferating the object as a purchase point throughout the virtual environment, may offer a 10% commission on the sale of the product when purchased via the virtual object. Thus incentive can be added for stores throughout the virtual environment to place the virtual object in their stores. This allows businesses to click and drag virtual objects that represent the supply chain of the seller of the physical product.

A user may create an event to trigger a purchase of real world products that are sold in the environment. For example, a bulk order of one hundred units of a product, i.e. 100 digital cameras. That user may create a virtual object representing one digital camera for sale. The user may place this virtual object representing the digital camera in a virtual store. Other users, who may understand, for example via AVR information associated with the virtual object, that a purchase of one or more units allows them to participate in the bulk order, may select "purchase." The original user may have set the purchase event to trigger the bulk order when a predetermined number of units have been sold. When triggered the system will preferably charge and credit all appropriate accounts and provide shipping information to appropriate parties.

Individuals and businesses may be able to use a Universal Product Code (UPC) scanner to scan product codes or manually enter the numerical codes with a keyboard of real world products. A subsystem may receive this input, accesses the national UPC system to pull product information and accesses the app store database to pull corresponding 3D objects. Both the product information and 3D object are preferably delivered to the individual or businesses for the purpose of populating virtual stores with 3D objects that represent the real world products for sale or for the general population of the virtual environment with objects, decor, etc. Additionally, the product information may be used to attach information to the object using an AVR/AR editor that may be an application in the deed suite of applications.

Once the objects are placed, the owner of the property can select the object in the virtual environment. Any information associated with the UPC by the manufacturer of the product, such as product specifications and descriptions, would then be displayed as AVR in the environment. The owner may be able to format this information and add, subtract and change information as needed to create the experience they desire for their visitors. These changes can be stylistic to create a visual experience. They can also include links, pricing, purchase options etc.

A person can put an item on layaway for a set period of time at which point the system will force the purchase. During that period, all individuals and/or stores in the virtual environment who are selling that product can elect to be notified that an anonymous user has put that product on layaway at a certain price and the sellers will have the opportunity to beat the price for the purchasing user. The purchasing user can accept the new bid and complete the transaction, which would cancel the original offer, or accept the new bid as a layaway repeating the process. Likewise, the seller may sell the product to another user who is willing to pay the original price while the buyer is waiting for lower bids. The process preferably ends when the purchasing user completes a purchase from a new seller or the purchase is forced due to no new bids.

Development Tools

The objects, functions, and applications available to users are creatable by users and developers. The system preferably offers a virtual research and development complex for users to create and test applications, objects, and functions. The system will provide users with a variety of development tools. Users may be able to send requests to the system for new applications, objects, and/or functions that another user may attempt to develop. Requests may be rated by other users to give developers a sense of what the market wants. Preferably the system will have an open source code to facilitate development of new applications, objects, and functions.

Users are able to create 3D object files in a virtual development studio through the system's 3D modeling and rendering software. Preferably, once a user has created an object, the user is able to drag the object from the studio into a database of files via the HUD. Once in the database, files may be named and provided with a description. Additionally, files may be private (password protected) or public (available to all users). Additionally, users may be able to package objects to be sold in the app store. Preferably users can use a virtual facility to develop and test, for example, an object's physics, collision detection and response, sound, scripting, animation, artificial intelligence, networking, streaming, memory management, treading, localization support, and/or scene graph.

Other development tools include, but are not limited to floor planning and architectural tools, terrain and landscaping tools, 3D imaging tools, software creation tools, HUD development tools, and game creation tools.

In the preferred embodiment, the system is capable of converting or translating a traditional 2D website into a 3D virtual structure. Preferably, the system is able to parse the 2D website's HTML code, extract necessary components, and create and/or locate a corresponding 3D object to populate the 3D virtual structure with. For example, if the owner of a 2D website selling products desires to convert the 2D website into a 3D virtual store, the system may parse the HTML of the 2D website, determine what products are for sale, replace 2D images with 3D renderings of the products and position them in the virtual structure, extract the associated text for each product, and display the text within the 3D virtual store adjacent to the 3D rendered product. The 3D renderings of products may be stored in a general database of 3D renderings, be provided by the 2D website's owner, or be generated from 2D images by the system.

In the preferred embodiment, the deed suite of applications contains applications users can interface with via their HUD that provide a variety of property development and other development tools.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A three-dimensional (3D) virtual environment rendering system, comprising:
   a central processing device;
   at least one 3D virtual environment server;
   a plurality of user devices in data communication with the central processing device,
   wherein a first portion of the user devices are visitor devices and a second portion of user devices are developer devices;
   a plurality of application servers in data communication with the central processing device; and
   software executing on the central processing device, wherein the software:
   compiles data from the at least one 3D virtual environment server;
   creates and renders an open 3D virtual environment based on the compiled data from the at least one 3D virtual environment server and accessible by users with access to the Internet;
   outputs the rendered open 3D virtual environment to each of the visitor devices;
   receives visitor data from each of the plurality of visitor devices;
   updates the rendered open 3D virtual environment based on the visitor data received from each of the visitor devices in the open 3D virtual environment;
   receives changes to the open 3D virtual environment from the developer devices;
   updates the rendered open 3D virtual environment based on the changes to the open 3D virtual environment in the open 3D virtual environment;
   receives application data from each of the application servers;
   updates the rendered open 3D virtual environment based on the application data received from each of the application servers in the open 3D virtual environment; and
   outputs, in real time, the updated rendered open 3D virtual environment to each of the visitor devices;
   wherein the open 3D virtual environment serves as a direct interface with the Internet by allowing visitors with access to the Internet to visually navigate the world wide web and developers with access to the Internet to change the world wide web.

2. The system of claim 1, wherein application data rendered in the open 3D virtual environment affects each user's interactions with the open 3D virtual environment.

3. The system of claim 2, wherein at least a portion of the application data rendered in the open 3D virtual environment creates one of a virtual store, a user's avatar, a user's virtual storage, virtual scenery, another structure, a product, functions or scripts that affect the open 3D virtual environment, applications or collections of scripts, objects that represent applications, objects that represent functions, structures with applications and functions as a package, a representation of a real world object or combinations thereof.

4. The system of claim 1, wherein the application data is metadata directing the central processing device to an executable application for rendering in the open 3D virtual environment.

5. The system of claim 4, wherein the metadata includes at least one of where the source application exists, who can execute the application, and what events trigger the execution of the application.

6. The system of claim 1, wherein the data received from each user includes at least one of the users IP address, the type of device the user is accessing the open 3D virtual environment from, the operating system and version of the user's device, the browser and version of the user's device, the peripheral components connected to the user's device, and real world location information of the user.

7. The system of claim 1, wherein the central processing device renders a unique view of the open 3D virtual environment for each user that is based on the location of the user within the open 3D virtual environment and changes as the user navigates though the open 3D virtual environment.

8. The system of claim 1, wherein the open 3D virtual environment is divided into a plurality of zones, wherein each zone is associated with at least one application that dictates the ability of users to interact the open 3D virtual environment within the zone.

9. The system of claim 8, wherein each zone covers at least a portion of the open 3D virtual environment or is associated with an object within the open 3D virtual environment.

10. The system of claim 8, wherein at least a portion of the users control portions of the open 3D virtual environment and the users are presented with the option of creating and editing zones in the portions of the open 3D virtual environment within each user's control.

11. The system of claim 10, wherein users are presented with the option of associating applications to zones in the portions of the open 3D virtual environment within each user's control.

12. The system of claim 11, wherein at least one application associated with a zone presents a user with the option of toggling between a 2D website and the open 3D virtual environment.

13. The system of claim 12, wherein as a user navigates through the 2D website, an avatar of the user moves, correspondingly, through the open 3D virtual environment.

14. The system of claim 8, wherein at least one zone is associated with at least one real world location and a user visiting the zone in the open 3D virtual environment and a person, with an augmented reality device, visiting the at least one real world location is presented with at least some of the same information.

15. The system of claim 1, wherein the software executing on the central processing device further renders augmented virtual reality information within the open 3D virtual environment, wherein the augmented reality information provides the user with information about the open 3D virtual environment and objects within the open 3D virtual environment.

16. The system of claim 15, wherein the users are presented with the option of creating and editing augmented virtual reality information for rendering in the open 3D virtual environment.

17. The system of claim 1, wherein the user views the open 3D virtual environment through a heads up display (HUD), wherein the HUD is overlaid on the virtual environment and displays applications that at least one of allow the user to interact with the open 3D virtual environment, provides the user with information pertaining to the open 3D virtual environment or the real world, and allows the user to access data on the user's device or cloud storage associated with a user's account.

18. The system of claim 17, wherein the users are presented with the option of editing, adjusting, and customizing their HUD.

19. The system of claim 1, further comprising a database of application data accessible to users to associate applications with at least a portion of the open 3D virtual environment.

20. The system of claim 1, wherein at least a portion of the users control portions of the open 3D virtual environment and a fee is charged for each portion of the open 3D virtual environment controlled by the users.

* * * * *